United States Patent [19]

Job

[11] Patent Number: 5,288,342

[45] Date of Patent: Feb. 22, 1994

[54] SOLID METAL-CARBON MATRIX OF METALLOFULLERITES AND METHOD OF FORMING SAME

[76] Inventor: Robert C. Job, 4215 Kuykendall Rd., Charlotte, N.C. 28270

[21] Appl. No.: 816,636

[22] Filed: Dec. 31, 1991

[51] Int. Cl.$^5$ .................. C21D 6/00; C22C 38/00
[52] U.S. Cl. .................... 148/320; 420/129; 148/540; 148/538; 148/543
[58] Field of Search ............ 148/538, 540–543, 148/320; 420/590, 129

[56] References Cited

U.S. PATENT DOCUMENTS

| | | | |
|---|---|---|---|
| 2,209,935 | 7/1940 | Samuels | 420/590 |
| 4,432,936 | 2/1984 | Keith | 420/590 |
| 5,110,547 | 5/1992 | Kiuchi et al. | 420/590 |

OTHER PUBLICATIONS

Thomas L. Altshuler; *Advanced Materials & Process*, Sep. 1991; "Atomic-Scale Materials Character"; pp. 18-23.

Peter W. Stephens & Alan I. Goldman; *Scientific American*, Apr. 1991; "The Structure of Quasicrystals"; pp. 44-53.

David Stipp; *Wall Street Journal*, Nov. 6, 1991; "Researchers Find a Way to Form Film of Diamond Using Carbon 'Buckyballs'"; Technology & Health Section.

Gary McWilliams, et al,; *Business Week*, Dec. 9, 1991; "Science's Amazing New Building Blocks"; pp. 76-77.

J. D. Verhoeven et al,; *Materials Characterization* 24, 1990; "Damascus Steel, Part III: The Wadsworth-Sherby Mechanism"; pp. 205-227.

Robert F. Curl & Richard E. Smalley; *Scientific American*, Oct. 1991; "Fullerenes"; pp. 54-63.

Donald R. Huffman; *Physics Today*, Nov. 1991; "Solid $C_{60}$" pp. 22-29.

Rudy M. Baum; *C&EN*, Dec. 16, 1991; "Systematic Chemistry of $C_{60}$ Beginning To Emerge"; pp. 17-20.

*Statelog*, North Carolina State University, Fall 1991; "Exploring the 'buckyball'"; p. 4.

Ph Gerhardt, S. Löffler and K. H. Homann; "Polyhedral Carbon Ions in Hydrocarbon Flames"; *Chemical Physics Letters;* vol. 137, No. 4; Jun. 19, 1987; pp. 306-310.

H. W. Kroto, J. R. Heath, S. C. O'Brien, R. F. Curl & R. E. Smalley; "$C_{60}$: Buckminsterfullerene" *Letters To Nature;* vol. 318, Nov. 14, 1985; pp. 162-163.

Q. L. Zhang, et al.; "Reactivity of Large Carbon Clusters: Spheroidal Carbon Shells and Their Possible Relevance to the Formation and Morphology of Soot"; *The Journal of Physical Chemistry;* vol. 90, No. 4; Feb. 13, 1986; pp. 525-528.

W. Krätschmer, N. Sorg and Donald R. Huffman; "Spectroscopy of Matrix-Isolated Carbon Cluster Molecules Between 200 and 850 nm Wavelength"; *Surface Science* 156 (1985); pp. 814-821.

*Primary Examiner*—Deborah Yee

[57] ABSTRACT

A metallic solid comprising an metal-carbon matrix of an allotropic metal and metallofullerites of the allotropic metal is disclosed, along with an associated method of forming the solid by interrupting and temporarily holding a metal-carbon melt at the point through the cooling curve at which the solidifying metal passes through the allotropic transformation stage for the metal defined by the overall proportion of allotropic metal and carbon in the melt.

20 Claims, 37 Drawing Sheets

FIGURE 1

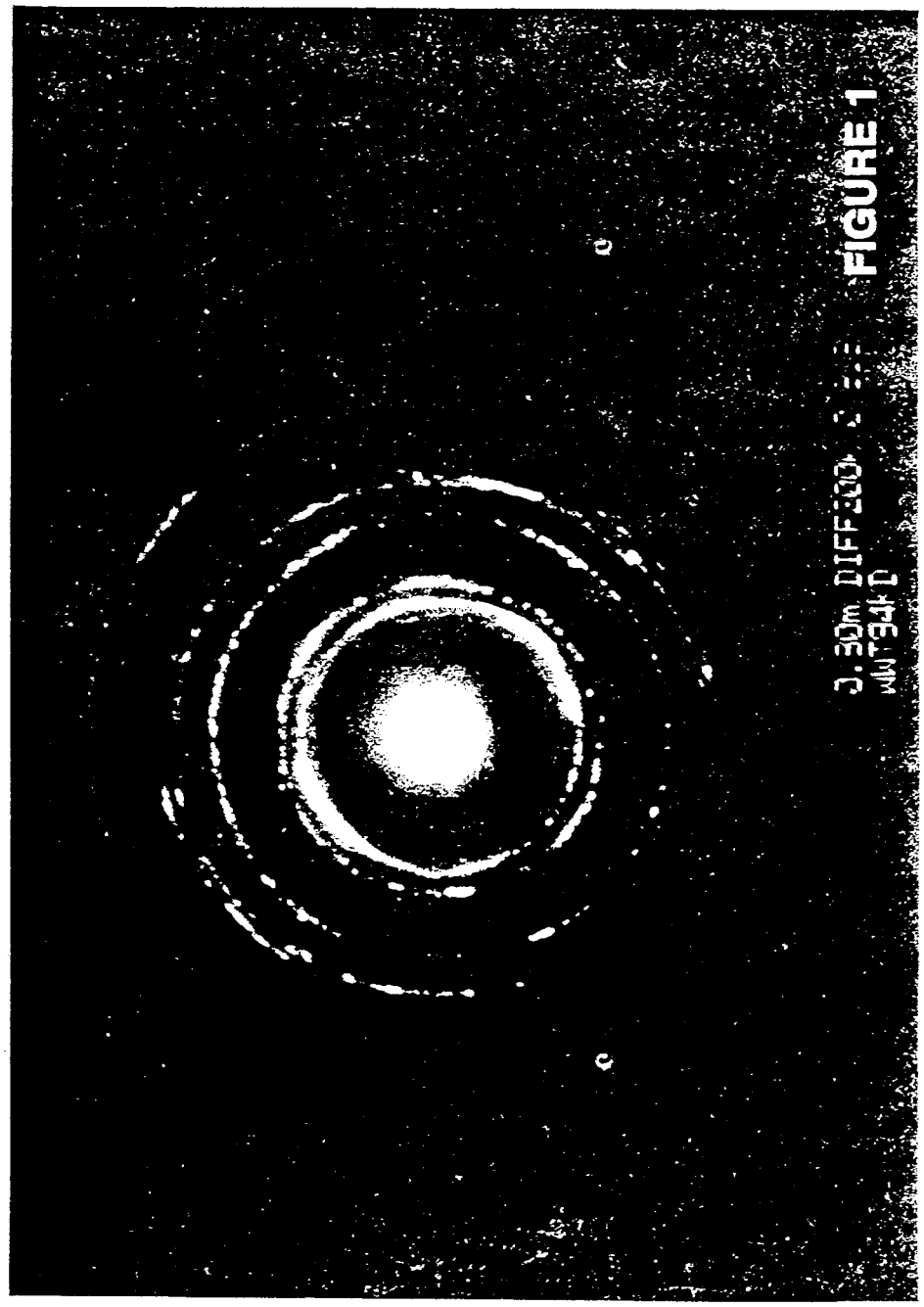

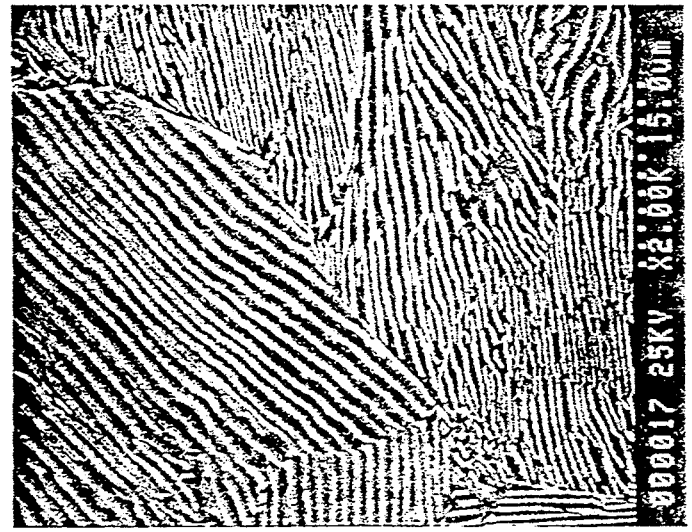
FIGURE 6 (c)
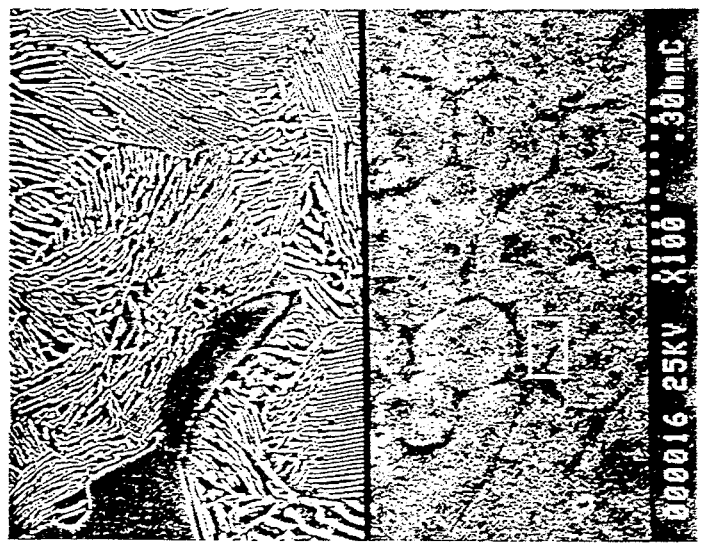
FIGURE 6 (b)
FIGURE 6 (a)

5,288,342

SOLID METAL-CARBON MATRIX OF METALLOFULLERITES AND METHOD OF FORMING SAME

FIELD OF THE INVENTION

The present invention relates to metals and metal alloys such as ferro-carbon steels, and in particular relates to a novel crystalline structure for a steel or steel like material in which the carbon is present in the form of fullerene molecules and forms a metallofullerite lattice with the iron.

BACKGROUND OF THE INVENTION

Steel is the term used to refer to alloys of iron and small percentages of carbon. In some nomenclatures, steel refers to any alloy in which carbon is present in amounts of between about 0.02 and 1.5% carbon by weight, but in other uses refers to alloys containing up to 2.25% or more carbon. Although the exact percentage borderline may differ depending upon the nomenclature, alloys with higher carbon contents are usually referred to as "cast iron" rather than as steel.

As is known to those generally familiar with steels, the iron and carbon are present in two main constituents, ferrite (iron) and cementite, an iron carbide compound having the general chemical formula $Fe_3C$. Most steels will also contain additional elements such as manganese, silicon, phosphorous, sulfur, oxygen, and traces of others. other steels contain considerable percentages of elements such as nickel, chromium, molybdenum, vanadium or titanium which give the resulting steel various appropriate or desired properties.

As known to those skilled in a variety of arts, steel is used in construction, ship hulls, auto bodies, machinery and machine parts, cables, abrasives, chemical equipment, and numerous other uses such as belts for tire reinforcement and the like. Within these uses, steel should desirably exhibit a number of metallic properties including compressive strength, tensile strength, ductility, hardness, and other related properties that are advantageously characteristic of useful metals.

Fullerenes is a term given to a recently postulated and discovered form of molecular carbon in which the carbon atoms are joined to form spheres, or sphere-like structures. Because of the resemblance between the structure of these molecules and the geodesic domes designed and championed by the architect Buckminster Fuller, such molecules have been designated as "fullerenes", and the basic and most stable molecule, a sphere having 60 carbon atoms, has been designated "buckminsterfullerene". For the same reasons, fullerenes have also been referred to as "buckyballs."

The best available evidence indicates that fullerene molecules were first identified and isolated in 1985, with rapid progress in their study beginning in 1990 when a relatively straightforward method of forming them was discovered by Donald Huffman and his co-workers at the university of Arizona; Huffman, "Solid C Physics Today, Nov. 1991, pp 22–29. In the last two years, fullerenes have received tremendous attention because of their apparent high chemical and physical stability, which is consistent with what would be expected and predicted based upon their molecular structure.

For a wide variety of electrochemical as well as mechanical reasons, one particularly sought-after use of fullerenes is to utilize the relatively large size of a the fullerene molecule, approximately 1 nanometer (nm, $10^9$ meter), to "wrap" a metal atom to produce molecules which have been speculatively referred to as metal fullerenes or, as used herein, metallofullerites with very unique characteristics. To date, however, no success has been realized in producing metallofullerites in quantities or at costs suitable for commercial utilization.

OBJECT AND SUMMARY OF THE INVENTION

It is therefore an object of the present invention to develop a process for the manufacture of metallofullerites in allotropic metallic materials.

It is another object of the present invention to develop a steel-like metal alloy having improved properties with respect to conventional steel of the otherwise same chemical composition, and to do so by incorporating the unique fullerene structures into the crystal structure of the steel or steel-like alloy.

The invention meets these objects with a solid ferro-carbon matrix of metallofullerites, and a method for making such a solid. As presently best understood, it appears that the metallofullerites are present as fullerene molecules surrounding iron molecules, chains of fullerene molecules surrounding rows or chains of iron atoms, and combinations of these to provide even larger composite structures. These structures exhibit unique and improved properties but with chemical composition otherwise similar to the traditional materials.

In a further aspect, the invention comprises a unique family of new metallofullerite materials of which the ferro-carbon described herein is an example. These new materials are comprised of allotropic metallic materials (based upon aluminum, chromium, cobalt, iron, molybdenum, nickel, platinum, titanium, tungsten, and vanadium) in which carbon is a primary constituent, and can also incorporate any appropriate alloying constituents to enhance the properties of said matrices.

In another aspect, the invention comprises a method of producing the steel-like alloy described herein. The method comprises mixing a high carbon allotropic metallic constituent and a low carbon allotropic metallic constituent of the same allotropic metal in an amount sufficient to form a mixture with a desired carbon content; heating the mixture to a temperature at which the high carbon constituent becomes liquidus and below the temperature at which the lower carbon constituent becomes liquidus; and forming fullerenes and fullerene chains in the mixture by temporarly holding the temperature within the temperature range of allotropic transformation for the mixture with the desired carbon content for a time sufficient for the carbon present to form fullerenes and fullerene chains.

BRIEF DESCRIPTION OF THE DRAWINGS

The foregoing and other objects, advantages and features of the invention, and the manner in which the same are accomplished, will become more readily apparent upon consideration of the following detailed description of the invention taken in conjunction with the accompanying drawings, which illustrate preferred and exemplary embodiments. It will be understood with those familiar with metal, metal alloys and crystal structures, that much of the information about the invention is incorporated in these figures. Thus, they are briefly described initially and then in more detail in the portion of the specification that folloys.

FIGS. 1, 2(a), 3(a), and 35 are X-ray diffraction patterns of an appropriate sample of the invention;

FIGS. 2(b), 3(b), and 6(a) and 6(b) through 9(a) and 11(b), 12, 13, 14(a) and 15 and 16 are transmission electron micrographs (TEM) of appropriate samples of the present invention;

FIGS. 35 is a 200,000 magnification TEM micrograph showing portions of an actual sample having a structure that appears to correspond to the model of FIG. 34;

DETAILED DESCRIPTION

Figure 3:
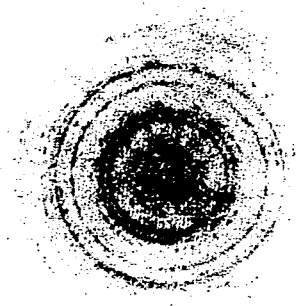
Figure 3:

The present invention is a macroscopic solid metallofullerite matrix and a process by which a family of metallofullerite matrices can be produced at commercially viable costs and quantities with all known existing metallurgical processes and technology.

In a preferred embodiment, the invention is a steel-like solid ferro-carbon matrix of metallofullerites. Although the terminology and nomenclature used in connection with these molecules is relatively new, the nomenclature used herein represents an attempt to be consistent with that used in the current literature. Thus, the term "fullerene" refers to a closed or almost entirely closed cage-like molecule of carbon atoms with a sphereoidal or substantially sphereoidal shape. The term "fullerite" refers to a macroscopic solid crystal structure of fullerene molecules, and the term metallofullerite refers to a macroscopic crystal structure in which the lattice is formed of metal atoms and fullerenes, and also includes—as described herein—crystal structures in which a fullerene molecule encloses a metal ion.

As further used herein, the term "matrix" refers to the principal phase or aggregate in which another constituent is embedded, and "ferro-carbon" refers to a solid allotropic compound of iron and carbon in which iron predominates by weight.

Thus, in a broadest sense of its product embodiment, the invention comprises a metallic solid comprising a metal-carbon matrix of an allotropic metal and metallofullerites of the allotropic metal. In more preferred embodiments the allotropic metal comprises iron and the matrix comprises a steel-like solid ferro-carbon matrix of iron fullerites.

In other embodiments, the allotropic metal is selected from the group consisting of: aluminum, chromium, cobalt, iron, molybdenum, nickel, platinum, titanium, tungsten, and vanadium.

In certain embodiments, the matrix comprises a homogenous matrix, and the metallofullerites include fullerenes having 60 and 70 carbon atoms in a molecule, or smaller or larger molecules referred to as hypofullerenes and hyperfullerenes, respectively.

In the presently most preferred embodiment, the invention comprises a steel-like solid comprising a ferro-carbon matrix of metallofullerites in which the metallofullerites comprise iron fullerites. In particular embodiments or even portions of embodiments, the metallofullerites comprise a quasicrystal structure.

Consistent with the composition of similar metals, particularly steels, the invention can comprise between about 0.35 and 2.25 percent carbon by weight, with a composition of about 1.2 percent carbon by weight being useful for comparison purposes.

As presently best understood, the ferro-carbon matrix of metallofullerites is a lamella structure and is nonpearlitic, with a crystal structure that is either hexagonal closest packing or face centered cubic packing. In other embodiments and portions of embodiments, and as described further herein, the invention can also comprise a spun cabled structure.

FIG. 1 is an X-ray diffraction pattern of an exemplary metallofullerite of the present invention. As understood by those of skill in this art, the interaction of X-radiation or "X-rays" with a crystal represents the reflection of radiation from one of the many sets of planes that exist in a three dimensional lattice. The manner in which X-rays are reflected or diffracted from a crystal structure, and the pattern that the reflected or diffracted X-rays form, is a well recognized descriptor of the crystal structure.

In particular, the pattern exhibited in FIG. 1 can be characterized as "powder diffraction" types of rings rather than as the individual Bragg diffraction maxima that would be exhibited by pearlite. These demonstrate that the material has single crystal domains on the order of 10 angstroms (i nanometer) randomly ordered relative to each other. Furthermore, the material is at least psuedo face centered cubic, with $a_o = 0.428$ nm. This corresponds to a closest Fe-Fe distance of 0.302 nm. By comparison, alpha iron is body centered cubic with $a_o = 0.286$ rm and an Fe-Fe closest distance of 0.248 nm.

Figure 2:
Figure 2:

The unusual nature of the diffraction pattern of FIG. 1 is further illustrated by FIGS. 2 and 3. FIG. 2(a) is a comparative transmitting electron (TEM) micrograph of the diffraction pattern of standard 1.2% carbon steel, which forms a characteristic structure referred to in the art as "pearlitell (FIG. 2(b)).

FIG. 3(a) shows an X-ray diffraction pattern for the invention in an embodiment that similarly contains 1.2% carbon. The differences between the X-ray diffraction pattern (and therefore the crystal structure) of the samples illustrated in FIGS. 2(a) and 3(a) are strikingly apparent. Although not wishing to be bound by any particular theory, the inventor believes that the diffraction pattern illustrated in FIG. 1 and in FIG. 3(a)—i.e. the circular symmetry and the bright center pattern—is precisely what is to be expected for a matrix that includes fullerenes, and that specifically includes fullerenes which encapsulate a metal atom, here an iron.

Figure 4:
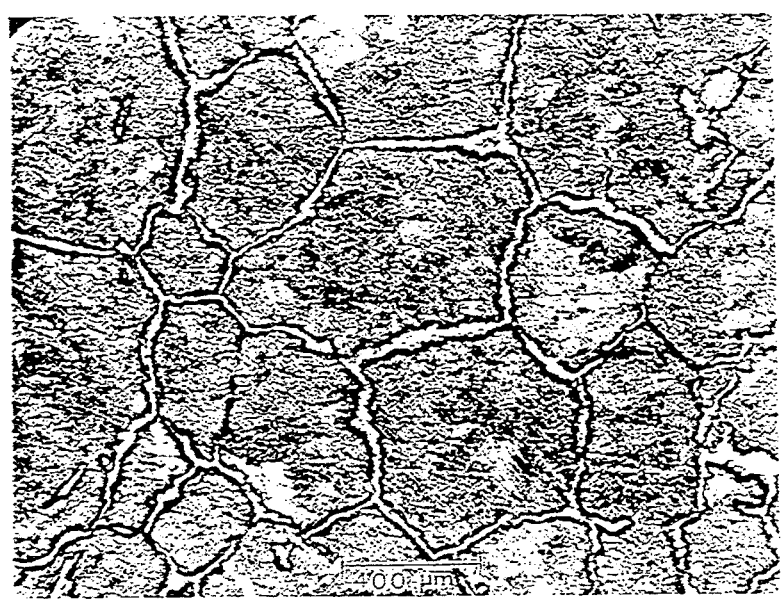
FIGS. 4, 5(a) and 5(b) are optical micrographs of respective cross sections of typical ordinary steel and of the invention.
Figure 5:
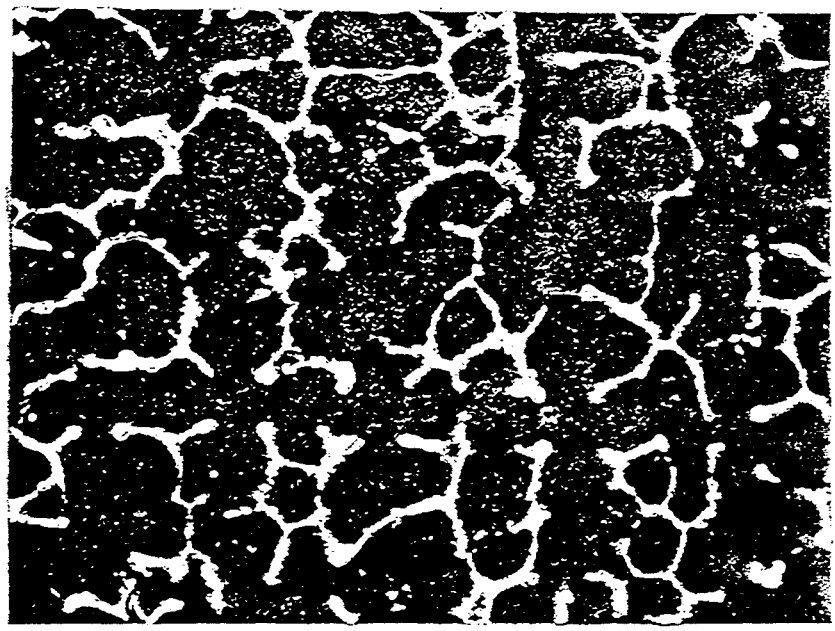
Figure 5:
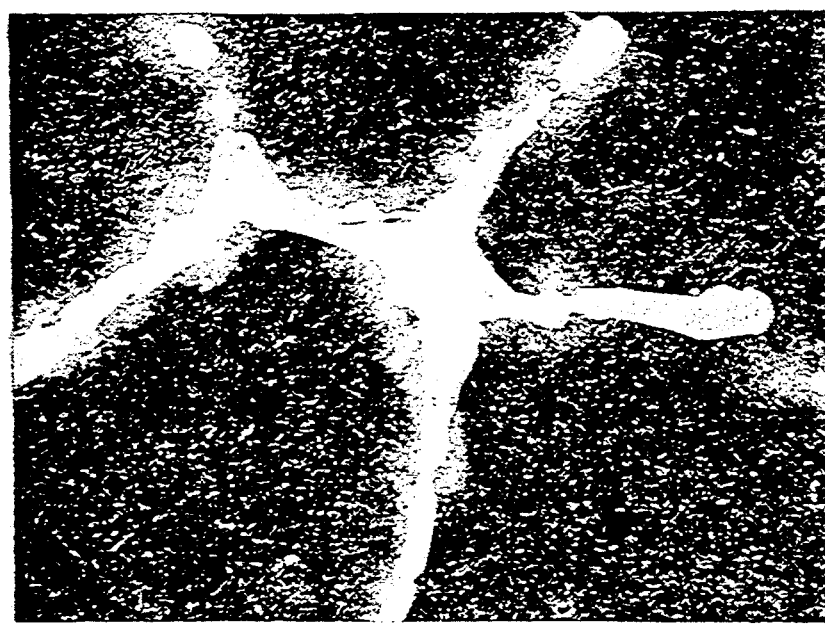

For further comparison purposes, FIG. 4 illustrates a cross sectional view taken at approximately 50×magnification of ordinary steel, while FIGS. 5(a) and (b) are cross sectional views of the invention taken at 50× and 400× magnification respectively. Again, the differences between the ordinary steel and the invention are quite apparent.

Figure 7:
Figure 7:
Figure 8:
Figure 8:
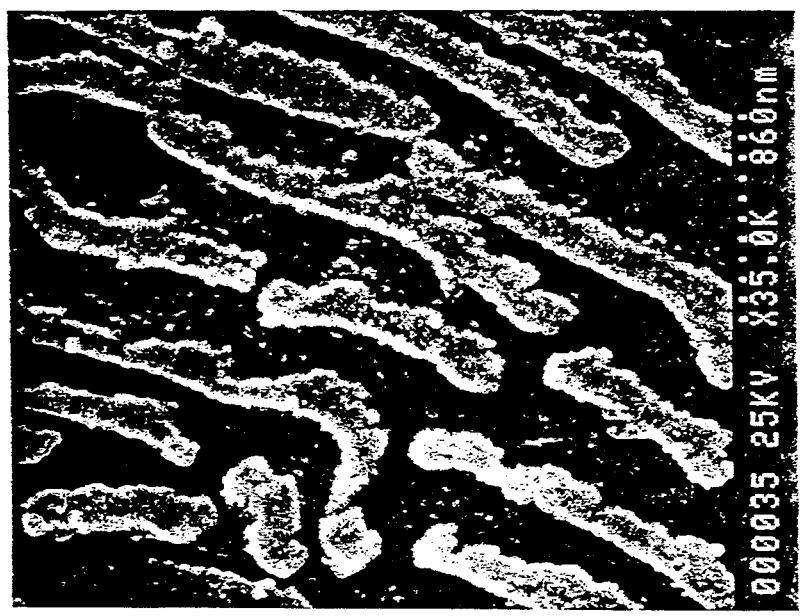

FIGS. 6, 7 and 8 further demonstrate the unique crystal structure of the ferro-carbon matrix of the present invention. In this regard, it will be understood that plain carbon steel generally forms in a structure known in the art as "pearlite". Pearlite is formed when a plain carbon steel of approximately 0.80% carbon by weight is cooled slowly from the temperature range at which the austenite form is stable and all of the ferrite and cementite precipitate together in pearlite's characteristic lamellar structure. Under a magnification of about 1,000, pearlite appears to be a pattern of dark and light layers that might best be described as resembling an irregular and patched fingerprint. The alternating appearance of dark and light portions is the result of excess ferrite or cementite first precipitating (depending upon whether the carbon content is above or below 0.80%) as a grain boundary, and along cleavage planes of the austenite.

In this regard, FIG. 6, illustrated as micrographs (a), (b) and (c), initially has an appearance very similar to pearlite, particularly the appearance of lamella. For comparison, FIG. 6(a) is taken at 100 magnification, 6(b) at 1,000 magnification, and 6(c) at 2,000 magnification.

FIG. 7 further illustrates what could upon brief evaluation appear to be pearlite, but which when evaluated more carefully does not include pearlite's characteristic grain boundary structure. FIG. 7(a) is taken at a magnification of 5,000 and 7(b) at a magnification of 10,000, and both are of the same sample as shown in FIG. 6.

FIG. 7(b) is particularly interesting in that the tent-like structure that appears is unexpected in typical metallic crystal structures, but is consistent with a crystal structure that includes helical arrangements such as are expected for fullerenes; see, McWilliams et al, "Science's Amazing New Building Blocks," Business Week, December 9, 1991, pages 76–77. As described later herein, FIG. 23 also appears to confirm such a helical structure.

FIGS. 8(a) and 8(b), however, clarify that the structure observed in the invention is not that of pearlite. FIG. 8(a), taken at 20,000 magnification, shows that the lamella type structure is not the result of alternating bands of ferrite and cementite, but rather a structure developed from pre-austenitic nucleated sites illustrating topographical characteristics, such as that found in aluminum alloys, which otherwise are a homogeneous matrix. FIG. 8(b), taken at a slightly greater 25,000 magnification is consistent with this interpretation.

FIGS. 6, 7 and 8 are also illustrative of another observed and significant property of the invention, specifically, its ability to be formed to an extreme hardness without the tempering and related techniques usually required to harden steels and steel-like metals. As set forth later herein, a hardness of 62 on the Rockwell C scale was obtained simply by flash quenching a sample of the invention in room temperature oil. Perhaps of even greater interest, the appearance of the material after such quenching is substantially identical to that shown in FIGS. 6–8. As known to those of ordinary skill in the metallurgical arts, such a substantially identical appearance after hardening is totally unexpected. Instead, the appearance is expected to change to reflect a different crystal structure that exhibits the different (i.e. increased) hardness.

Although the inventor does not wish to be bound by a particular theory, the characteristics of increased hardness accompanied by essentially identical appearance appear to be consistent with those predicted for fullerenes under compression, which have been shown to have extreme stability. In the invention, it appears that the quenching changes the crystal structure of the iron from beta ($\beta$) to alpha ($\alpha$) and thereby reduces the overall volume of the face centered cubic structure. This in turn appears to act to compress the fullerene molecules somewhat, which in current theory should increase their hardness (Huffman, supra page 28). This takes place, however, without any structural change, thus offering a tremendous advantage by eliminating the corresponding structural stress. Accordingly, and to further advantage, no tempering or normalizing is otherwise required.

Figure 9:
Figure 9:
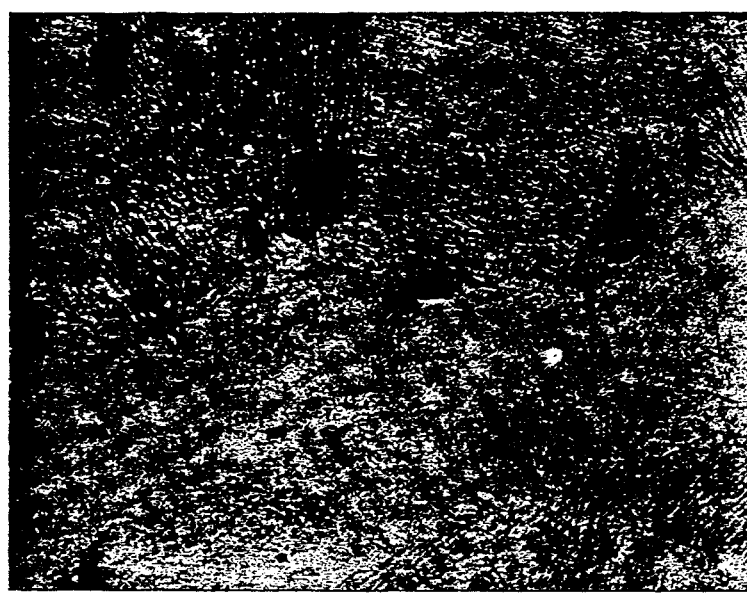

Some of the differences from the characteristic behavior of pearlite are further illustrated in FIGS. 9(a) and 9(b). Each of these micrographs is of an identical sample of the ferro-carbon matrix of the present invention. The sample surface in FIG. 9(a) was etched with a 2% nital solution, while that of FIG. 9(b) was etched with picral. It will be seen that the resulting appearance of the sample in FIG. 9(a) and 9(b) is identical, particularly the light and dark patterns. Were the sample one of ordinary pearlite, the images would be reversed from one another; i.e. those portions which appear dark in 9(a) would appear light in 9(b), and those portions which appeared light in 9(a), would appear dark in 9(b). Thus, the identity of appearance between 9(a) and 9(b) further demonstrates the unique structure of the invention, even though it comprises 1.2% carbon which would otherwise define a rather ordinary steel that would be expected to have a pearlite structure.

Figure 10:
Figure 10:
Figure 11:
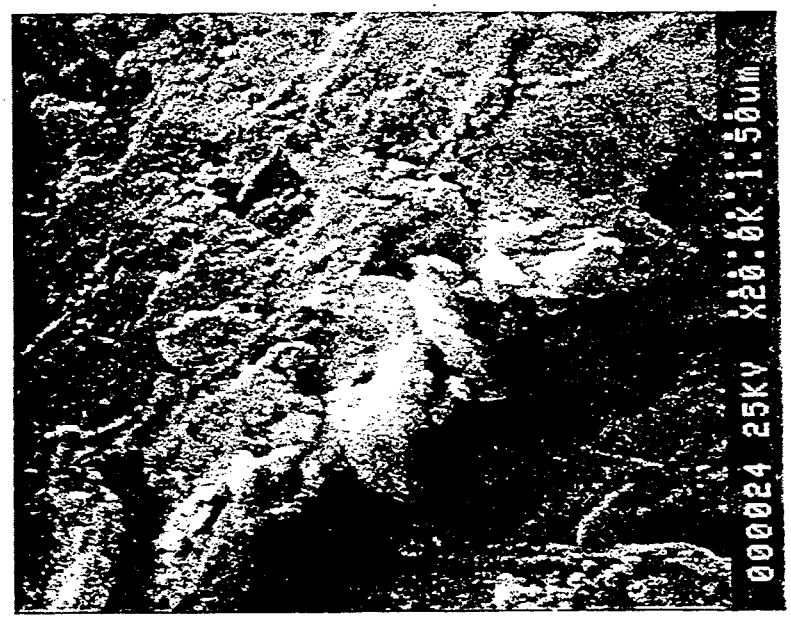
Figure 11:
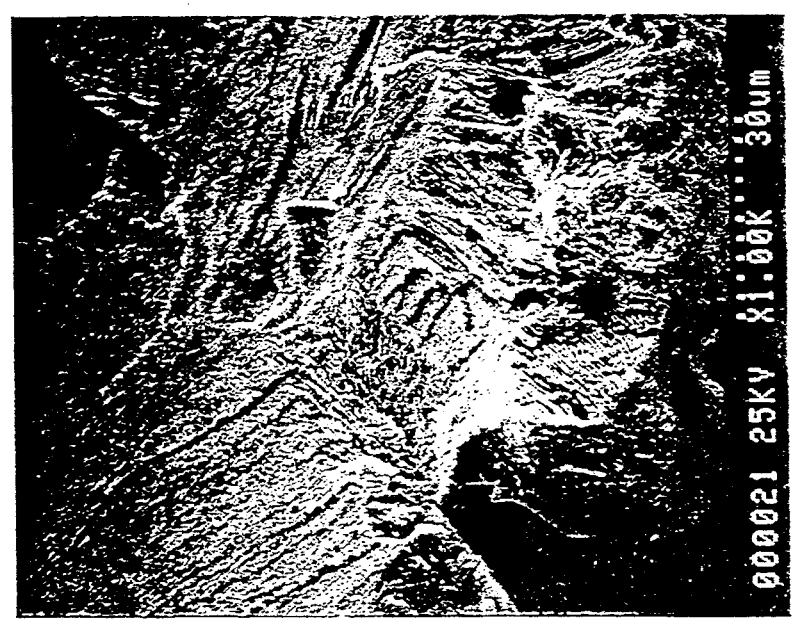

The remaining micrographs illustrate—primarily through their different appearance from that expected of pearlite—the unique nature of the ferro-carbon matrix of the present invention. FIGS. 10(a) and 10(b) illustrate electron micrographs of break samples of the present invention taken at 5,000 magnification (FIG. 10(a)) and 7,000 magnification (FIG. 10(b)). FIGS. 11(a) and 11(b) are similar micrographs at 1,000 magnification (FIG. 11(a)) and 20,000 (FIG. 11(b)) for tear samples. These are significantly different from the normal appearance of a tear sample of pearlite particularly in the fine or "feathered" structure that appears in FIG. 11(a) in which there is an absence of evidence of the stress and torsional forces experienced by pearlite during the normal tear testing process.

Figure 13:
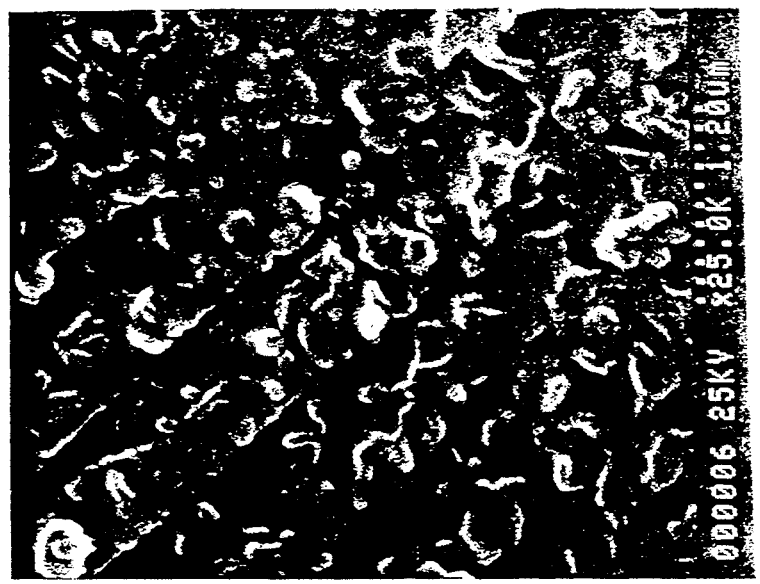
Figure 12:
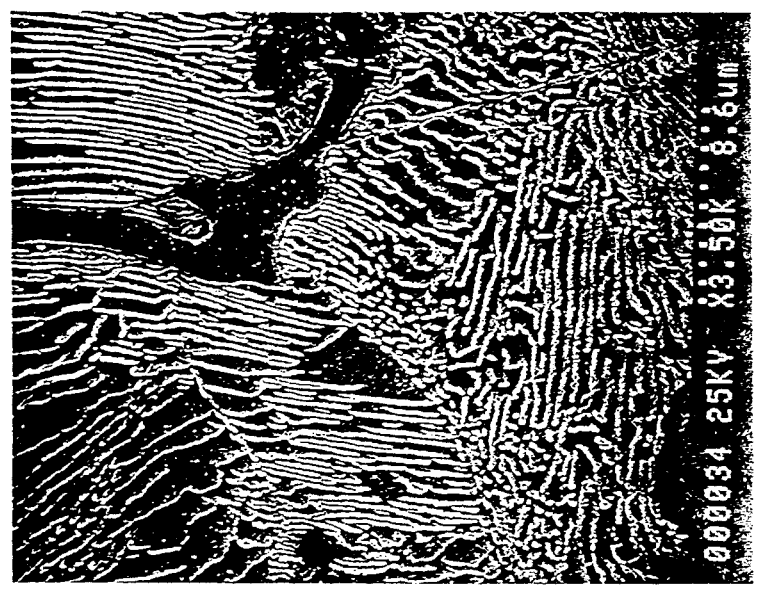

FIGS. 12 and 13 are scanning electron micrographs taken at a magnification of 25,000 for two samples of the present invention referred to as "359" and "369" respectively throughout the specification for identification purposes. The sample in FIG. 12 was etched with 2% nital, and that in FIG. 13 with ferric chloride, $FeCl_3$.

Figure 14:
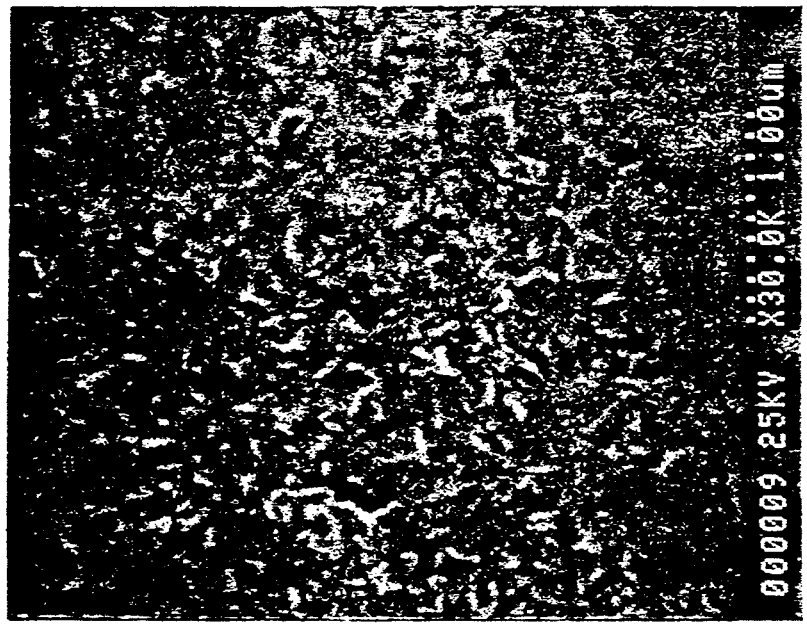
Figure 14:

FIGS. 14(a) and 14(b) are micrographs taken at 15,000 and 30,000 magnification respectively of a sample using 2% $FeCl_3$ as the etchant. The patterns developed under this particular etchant are what would be expected for a quasi-crystal type of structure (See, Stephens and Goldman, "The Structure of Quasi-Crystals", Scientific American, April 1991, pp. 44–53). This is likewise significantly different from the structure of ordinary pearlite which does not demonstrate such quasi-crystalline characteristics. In other words, the sample of the exemplary product of the present invention did not react to nital or picral in the manner that would normally be expected for hypo or hypereutectoid products.

Normally, the proeutectoid constituent would be present at the grain boundaries of the preexisting austenite and appear extremely bright under vertical bright-field illumination. In this respect, the sample of the exemplary product of the present invention appears metallographically dissimilar to the proeutectoid constituents present in hypo and hypereutectoid materials. In those materials with the same illumination at the same or similar magnifications, proeutectoid cementite lamellae are generally much thinner than those of ferrite. Additionally, the films (or boundary areas) of cementite have more irregular outlines than ferrite and also are bounded by sharp lines after either picral or nital etching, whereas those of ferrite are not bounded by sharp lines after etching. This is understood to result from the fact that ferrite is the continuous phase of the adjoining pearlite, so that little etching contrast develops between this ferrite and the proeutectoid ferrite. On first examination, this would appear to be the phase analysis consistent with the sample of the exemplary product of the present invention. Nevertheless, the remainder of the data indicate that the samples of the invention are not pearlite. In particular, when a proeutectoid constituent is actually cementite and the continuous phase is homogeneous (i.e. a type of cementite), a sharp step would develop between the proeutectoid cementite and the ferrite of an adjoining pearlite colony. No such step exists in the sample of the exemplary product of the present invention and, in fact, the continuous phase extends throughout the entire matrix except for slip planes relative to preexisting austenitic grain boundaries.

The transformation of austenite to an exemplary material of the present invention appears to be a classical example of a diffusional process. It is time dependent and the velocity of transformation varies markedly with temperature variations. The compositions of the products are different from those of the parent phase products. After an incubation period, a colony of fullerene-based material apparently nucleates, usually at an austenitic grain boundary, and each nucleating chain of fullerene crystalline structures grows as a colony until it impinges on an adjoining colony. These colonies are units of interpenetrating fullerene chains of carbon crystals and may be recognized in a section by the distortion rippling caused by the concentration of fullerene carbon colonies under compression.

Figure 15:
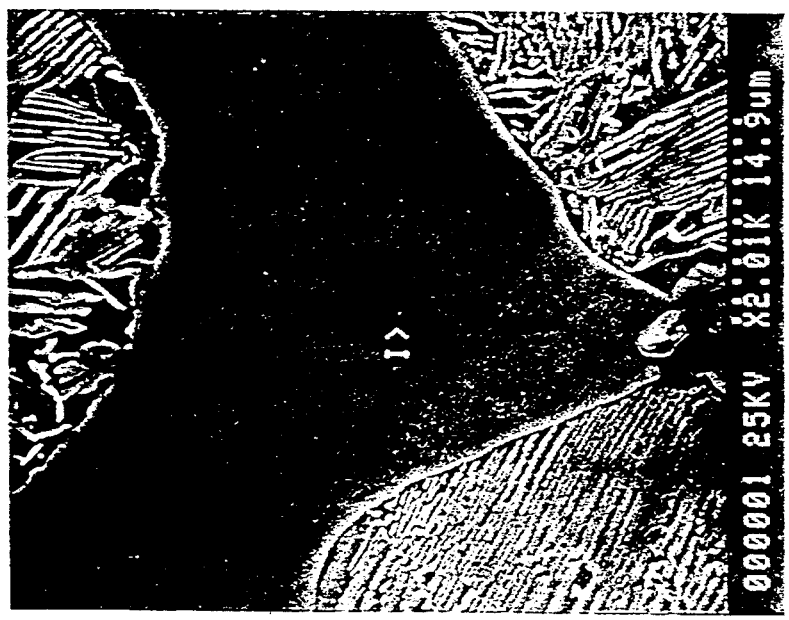

Further proof of the nonpearlitic structure of the ferro-carbon matrix of the present invention is illustrated by FIGS. 15, 16, 17, and 18. FIG. 15 is a sample of the ferro-carbon matrix of the present invention which upon initial appearance appears to have a lamella portion and a grain boundary, but as explained herein, this is simply the topography of the crystal, and does not represent any chemical or structural difference within the matrix.

Figure 16:
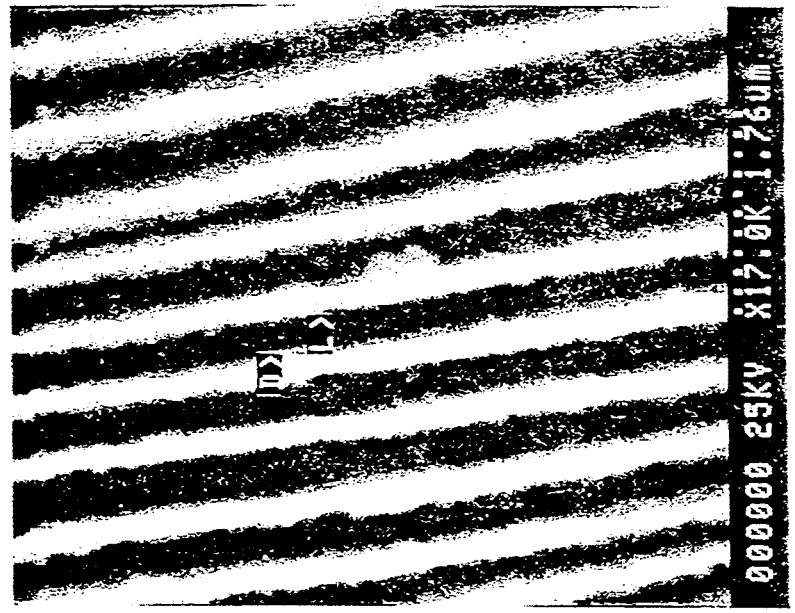

FIG. 16 is an enlarged view of a portion of the figure illustrating the lamella-appearing structure in more detail. FIGS. 15 and 16 include points I, D, and L which respectively show sample positions in the interstitial, dark, and light portions of the micrograph.

Figure 17:
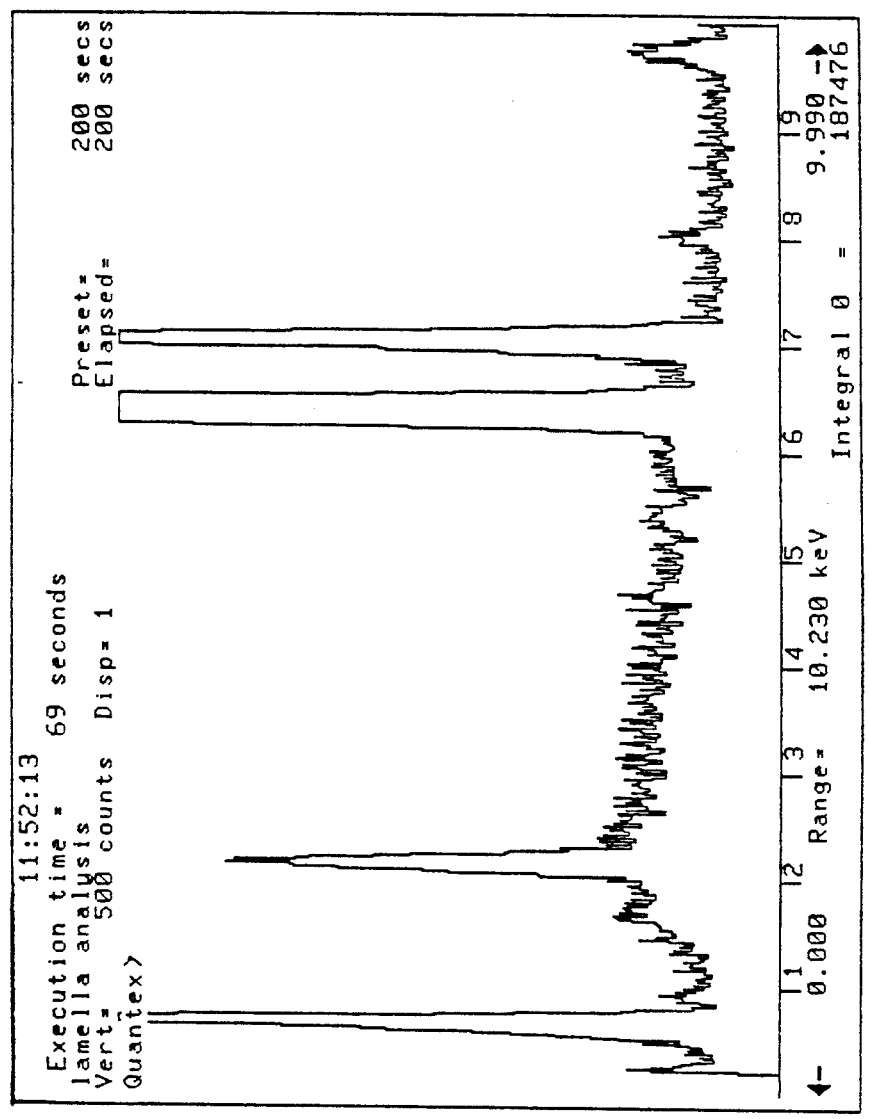
FIGS. 17, 18, and 19 are chemical analysis spectra of the present invention.
Figure 18:
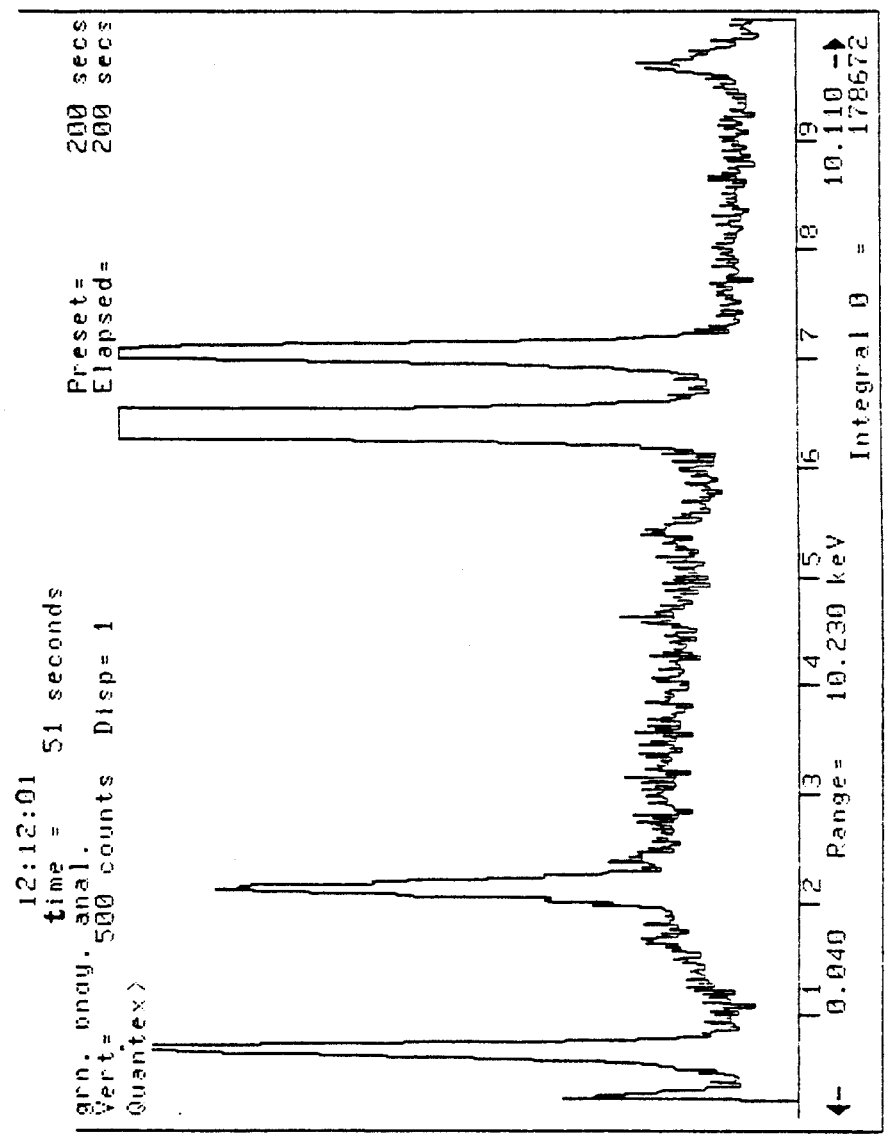
Figure 19:
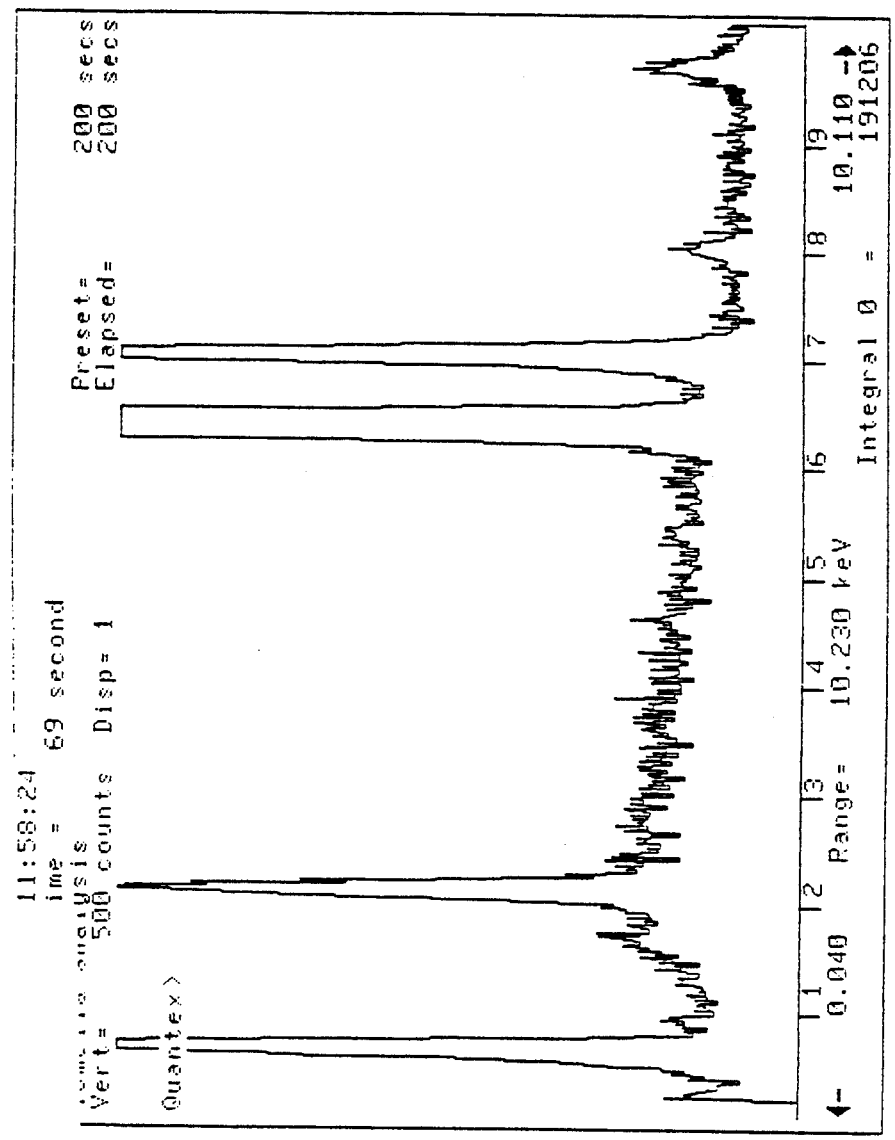

FIGS. 17, 18, and 19 are EDS compositional analyses corresponding to point L (FIG. 17) point D (FIG. 18), and point I (FIG. 19) respectively. If points D and L were the lamella of pearlite, the chemical composition of the two points would be quite different: cementite versus ferrite. The ferrite would be entirely iron (Fe), with minor impurities, while the cementite would be the iron carbide ($Fe_3C$) with any associated impurities. In contrast, FIGS. 17, 18, and 19 are essentially identical demonstrating that points I, D, and L in FIGS. 15 and 16, or indeed in any of the samples, are identical in chemical composition. This in turn demonstrates that the lamella are overall structural or topographical features, and not chemically different layers.

Figure 20:
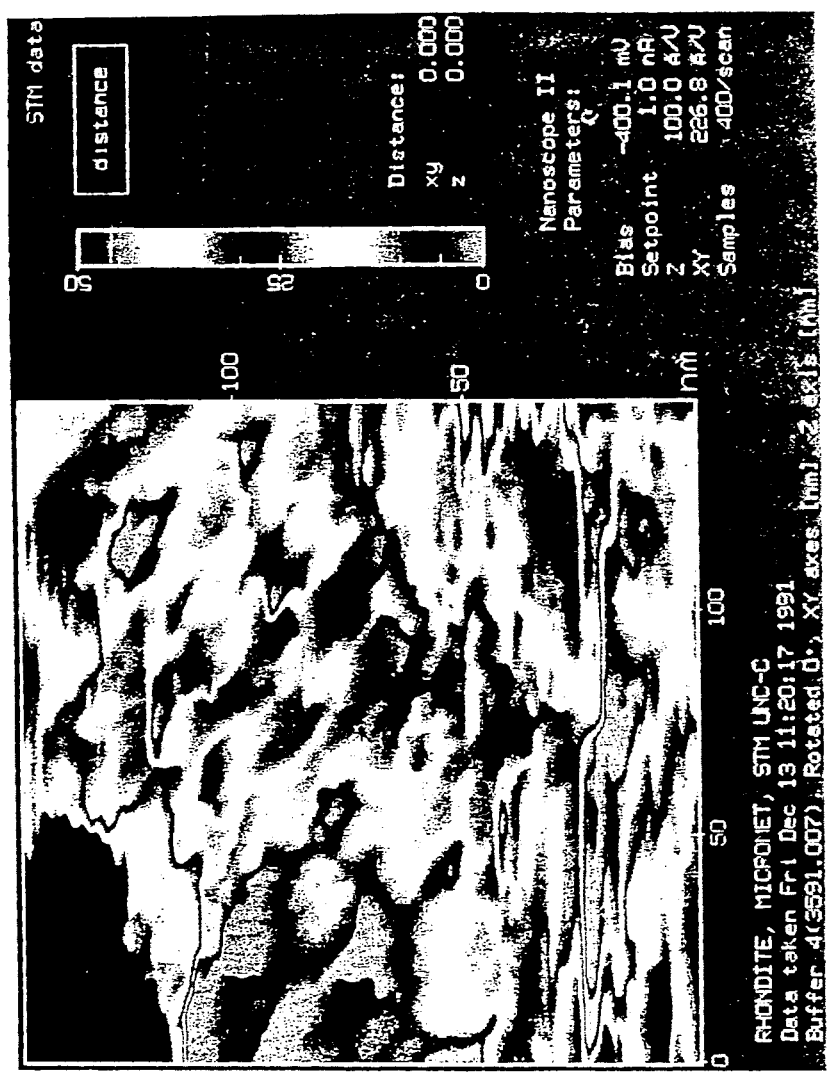
FIGS. 20 through 28 are scanning tunneling (STM) micrographs of similar samples of the invention in which structure is plotted as degrees of light and dark shading.
Figure 21:
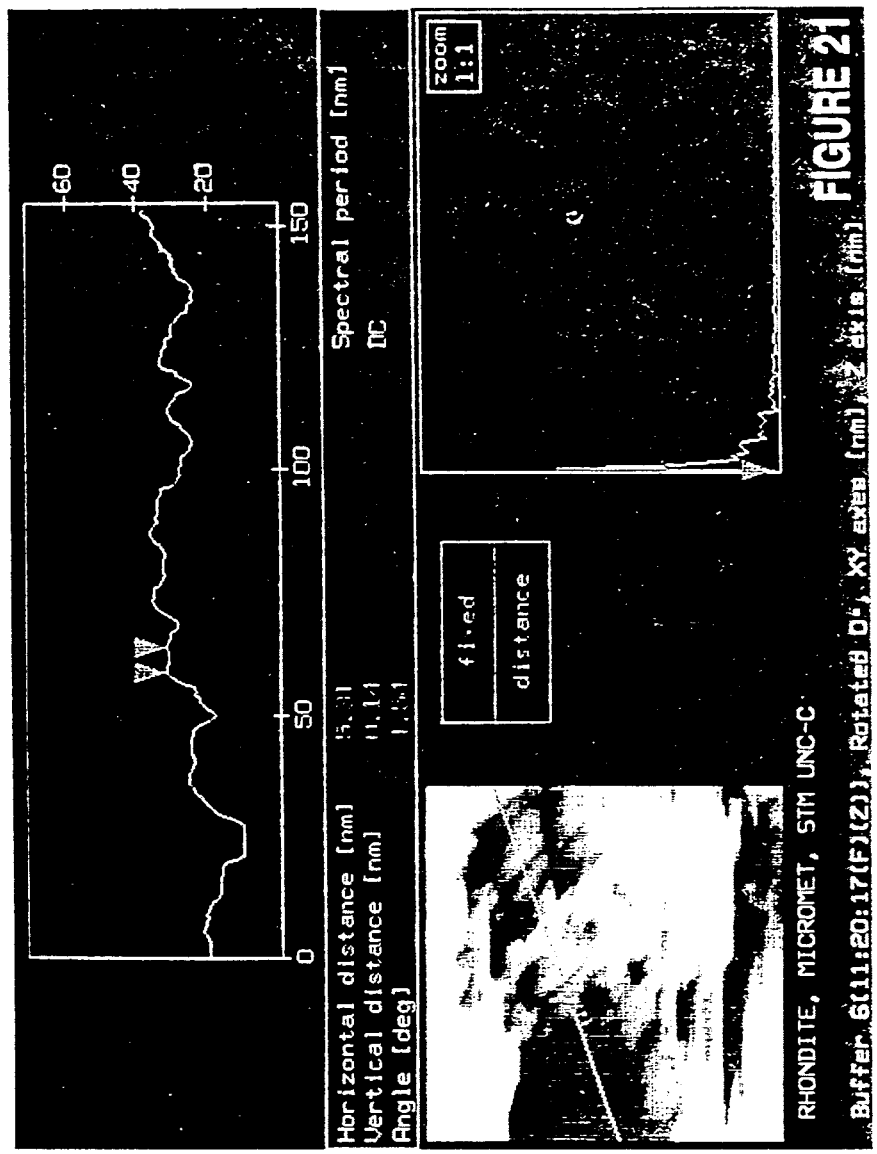

FIGS. 20 through 25 are a progressively more detailed series of scanning and tunneling (STM) micrographs for which the topographical data is plotted in the form of a two dimensional representation of lighter and darker portions. In these particular representations, the lighter portions represent those closer to the scanning device, while the darker ones represent those further away. In particular, FIGS. 20 and 21 are STMs taken across a 150 nm section and illustrates some of the major topographical features that appear at this scale.

Figure 22:
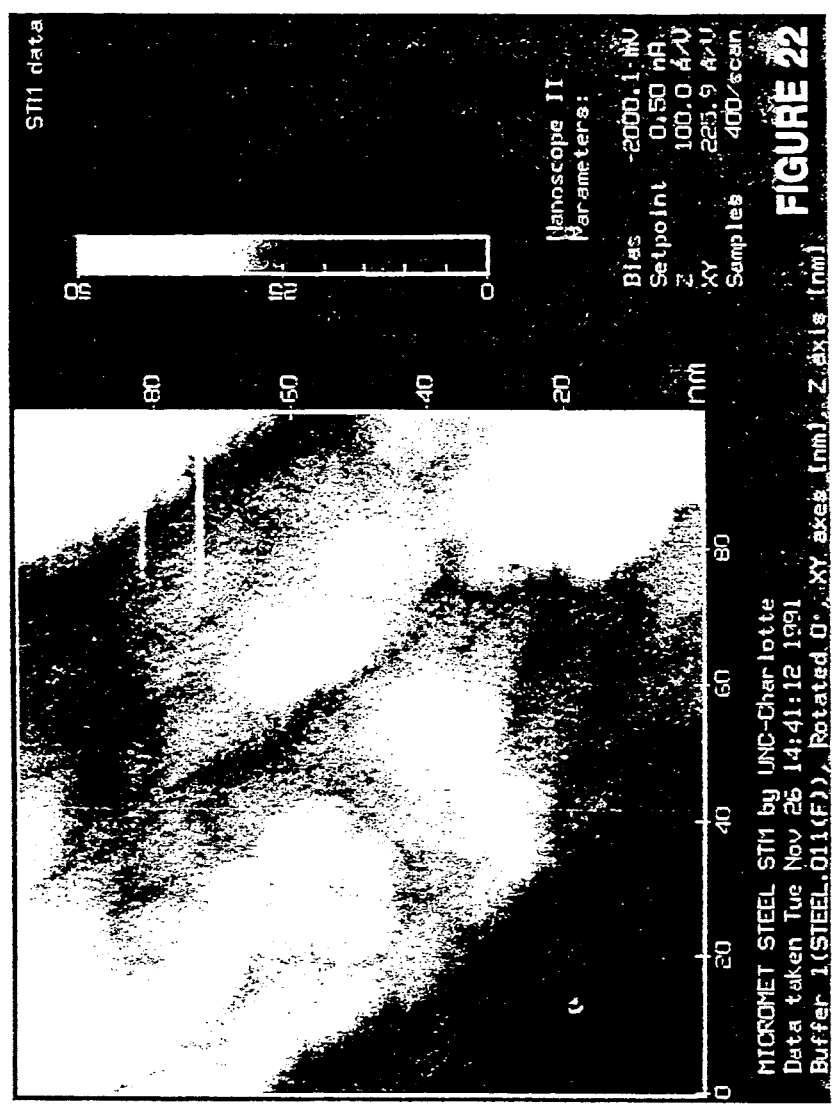
Figure 23:
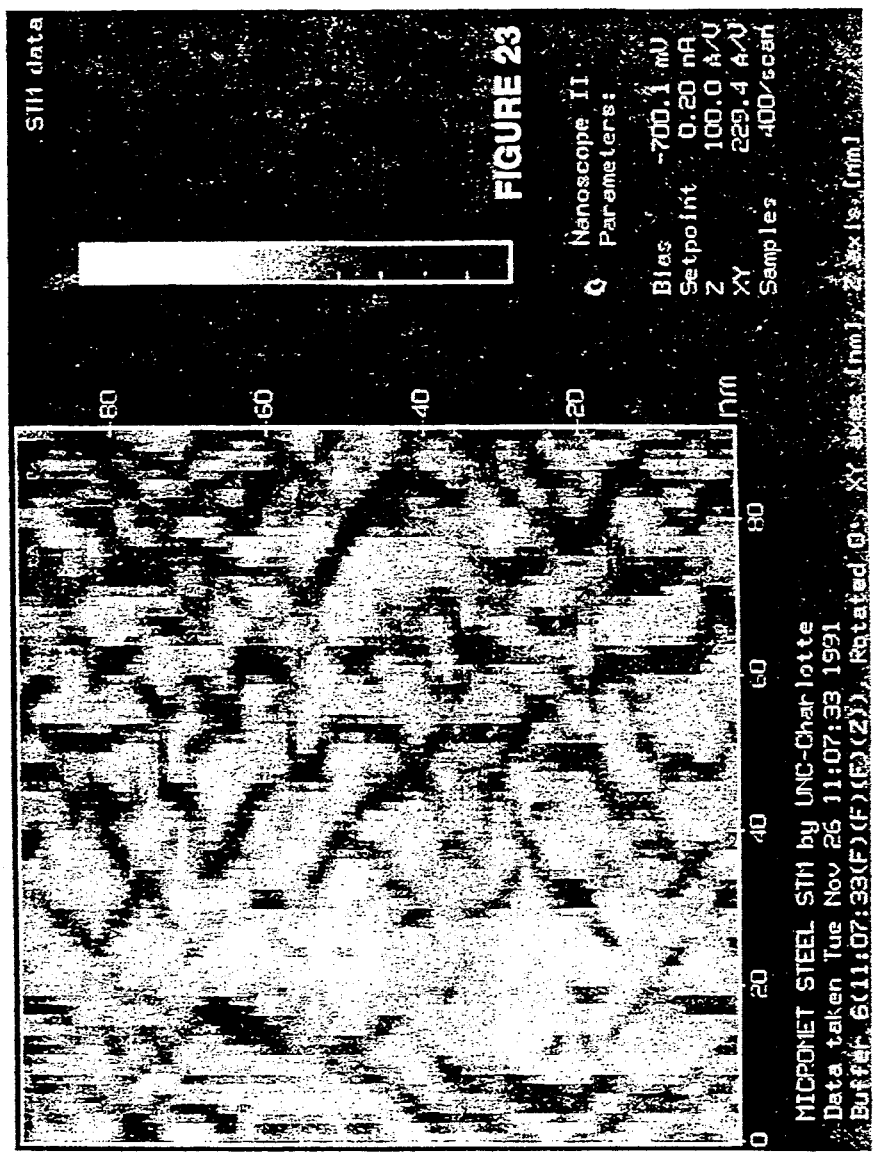

FIGS. 22 and 23 are both taken across a 100 nm scan and show progressively more detailed aspects of the structure. In particular, FIG. 22 illustrates fairly large metallofullerite ferro-carbon pseudospheres which appear as the large portions of between about 10 and 20 nm in dimension.

FIG. 23 is another 100 nm STM which illustrates the mimicked double-helix fullerene metallofullerite structure that has been predicted by those considering some of the expected properties of fullerenes in crystals and compounds; e.g. F.N. Diederich as noted by McWilliams et al, supra at page 77. It will be understood that the theoretically predicted size of a fullerene is on the order of about 1 nm (see; Huffman, supra at p 26) and it will be seen from FIGS. 22 and 23 that the smallest resolvable items on these micrographs are approximately that size.

Figure 24:
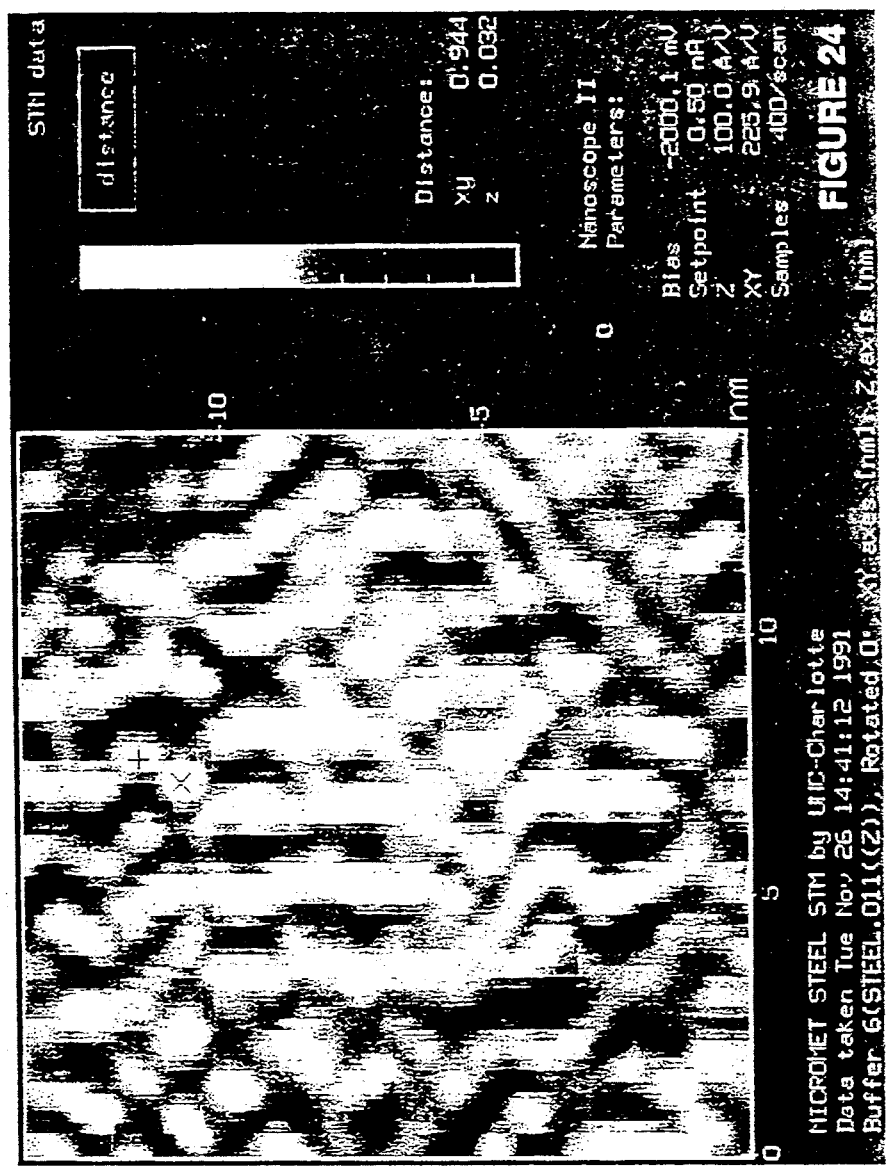
Figure 25:
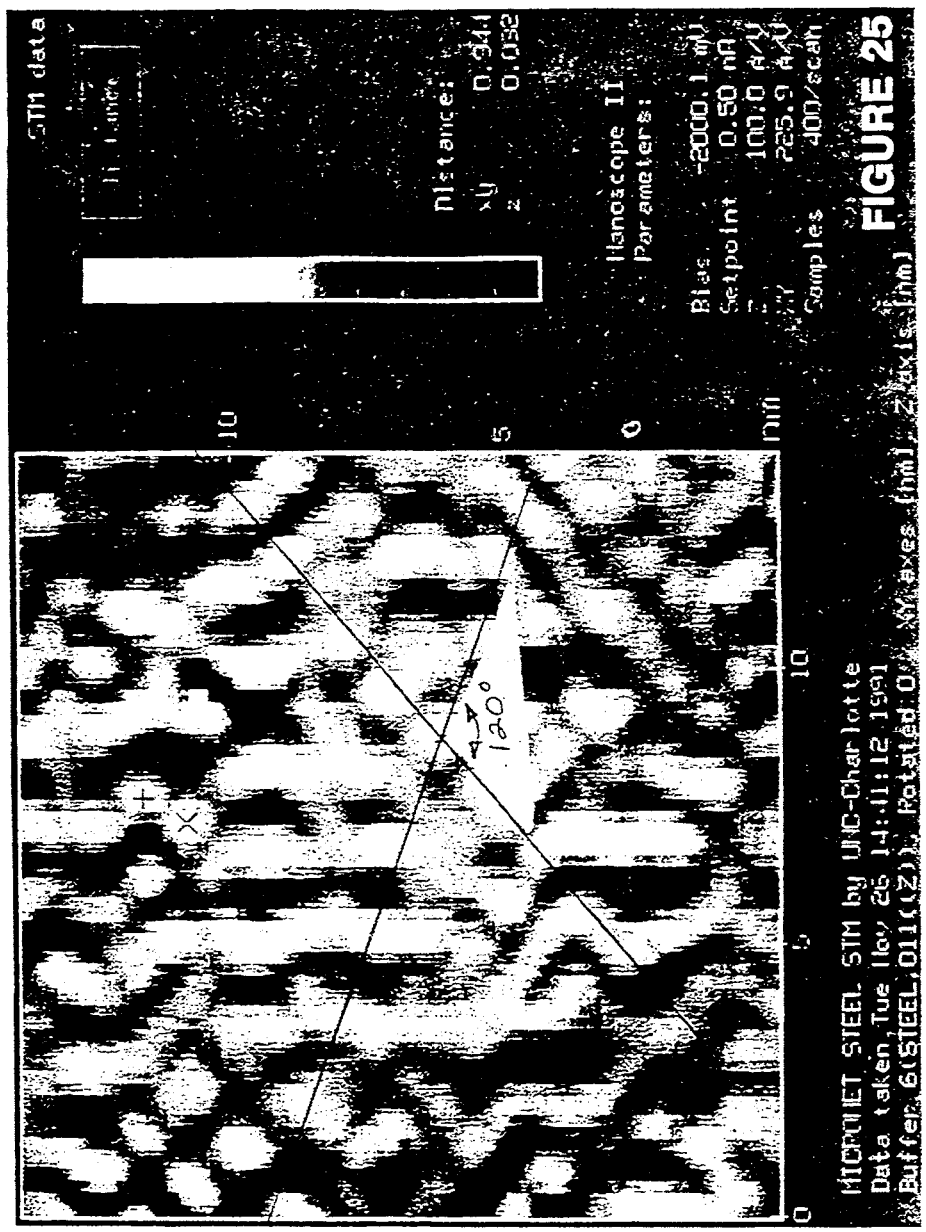

This size is further confirmed by FIGS. 24 and 25 which represent a 15 nm scan, and therefore the greatest magnification as among FIGS. 20 through 25. FIGS. 24 and 25 are identical with the exception that FIG. 25 includes a superimposed angle of 110° for purposes of illustrating the crystal structure. It will be seen from FIGS. 24 and 25 that a crystal lattice is present in which the predominant structures have dimensions of approximately 1 nm. As noted above, this is entirely consistent with that predicted for a $C_{60}$ fullerene molecule. Additionally, it has been predicted that in crystal size portions, $C_{60}$ fullerenes would pack in a closest packing fashion that has been described both as face-centered cubic (Curl and Smalley, "Fullerenes," Scientific American, October 1991, pages 54–63, at page 62; Huffman, supra at page 26) or hexagonal (Huffman, also at page 26). FIG. 25 appears to confirm this arrangement in which an illustrated angle of 110° has been superimposed on the micrograph so that each line is in alignment with at least three objects of apparently equivalent intensity (i.e. distance and therefore an identical plane). As can be seen from FIG. 25, the 110° angle superimposes nicely upon such objects of equal brightness and appears to further confirm the closest packing hypothesis and thus confirms the presence of the fullerene molecules in the ferro-carbon matrix of the present invention.

Figure 26:
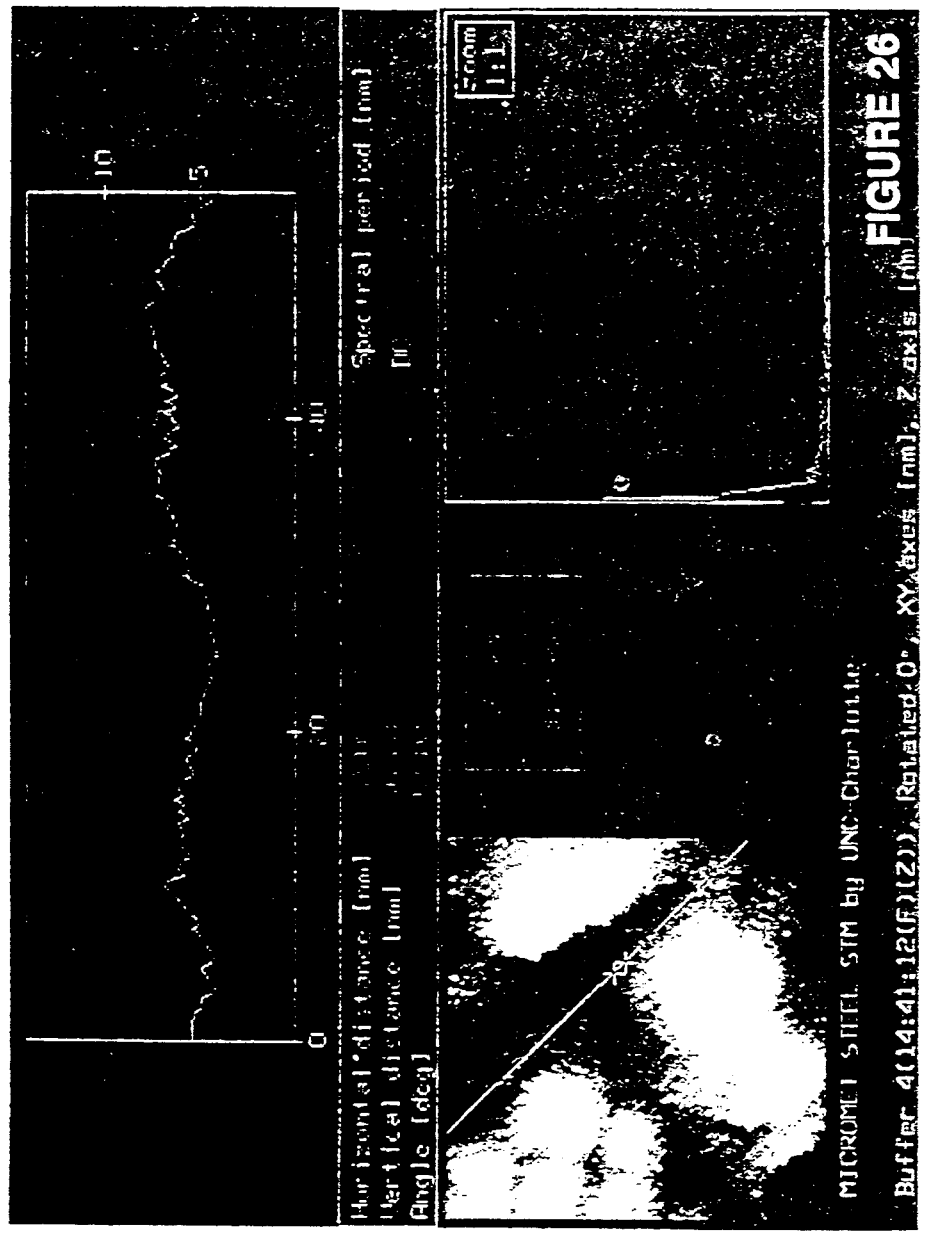
Figure 27:
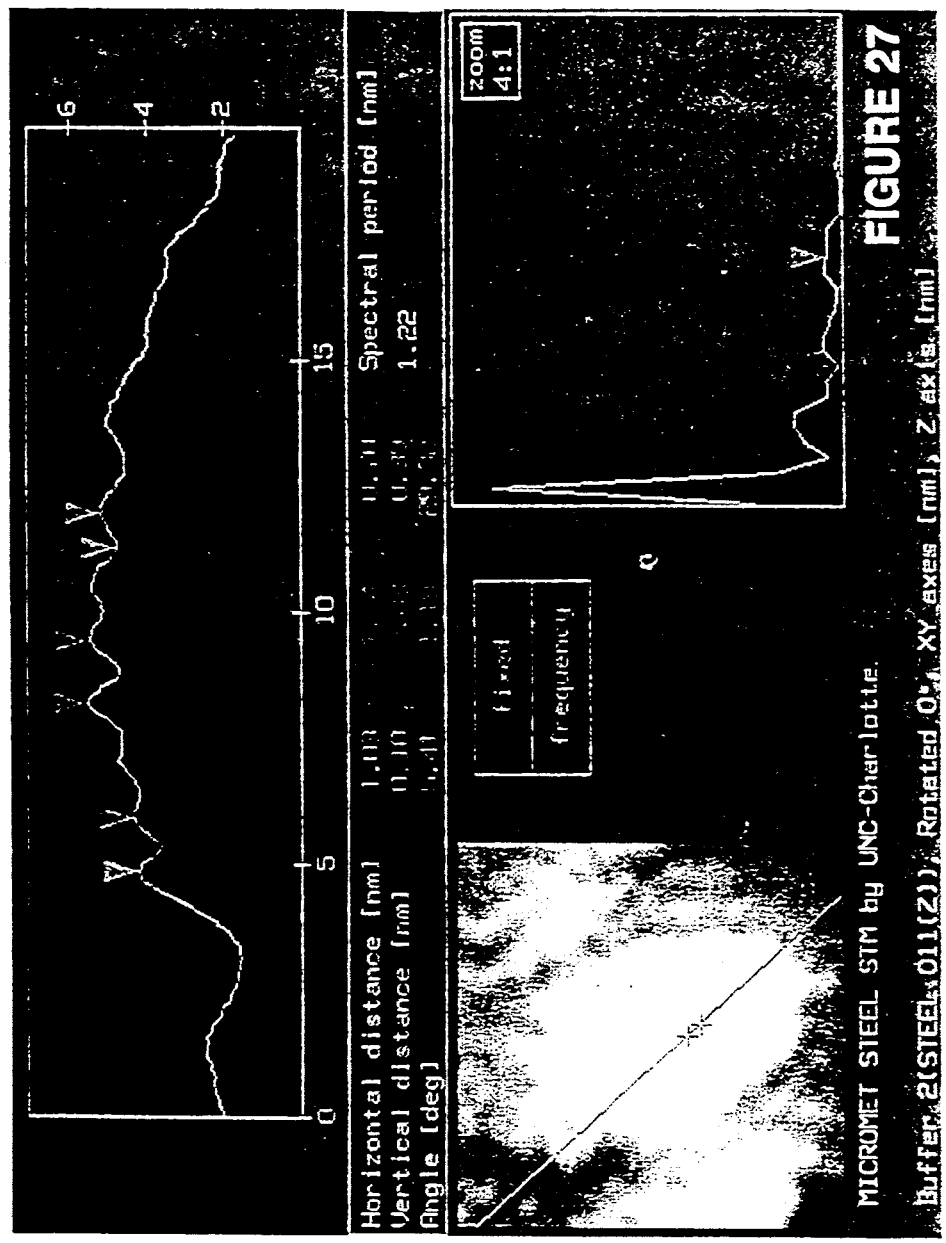

FIGS. 26 and 27 are similar micrographs, FIG. 26 being taken at 50 nm and FIG. 27 being taken at 20 nm with the exception that the data has been further expressed as a cross-sectional scale analysis in addition to the shaded image in the lower lefthand portion of each.

In the upper portions of FIG. 26, the distance between two predominant topological features has been indicated by the arrows and illustrate a horizontal distance between these features of approximately 2.09 nm, again in agreement with the expected size of a crystal in which 1 nm fullerenes would be adjacent one another.

This is further confirmed by the 20 rm STM of FIG. 27 in which similar topographical distances have been measured and shown to be on the order of about 1 nm between peaks or about 0.7 nm from one molecule to its nearest intersticial space. The data is thus again consistent with what would be expected for fullerene molecules in the $C_{60}$ size range; i.e. Huffman, supra at page 26 indicates a cage diameter of 7.1 angstroms (0.71 nm) for a $C_{60}$ molecule.

Figure 28:
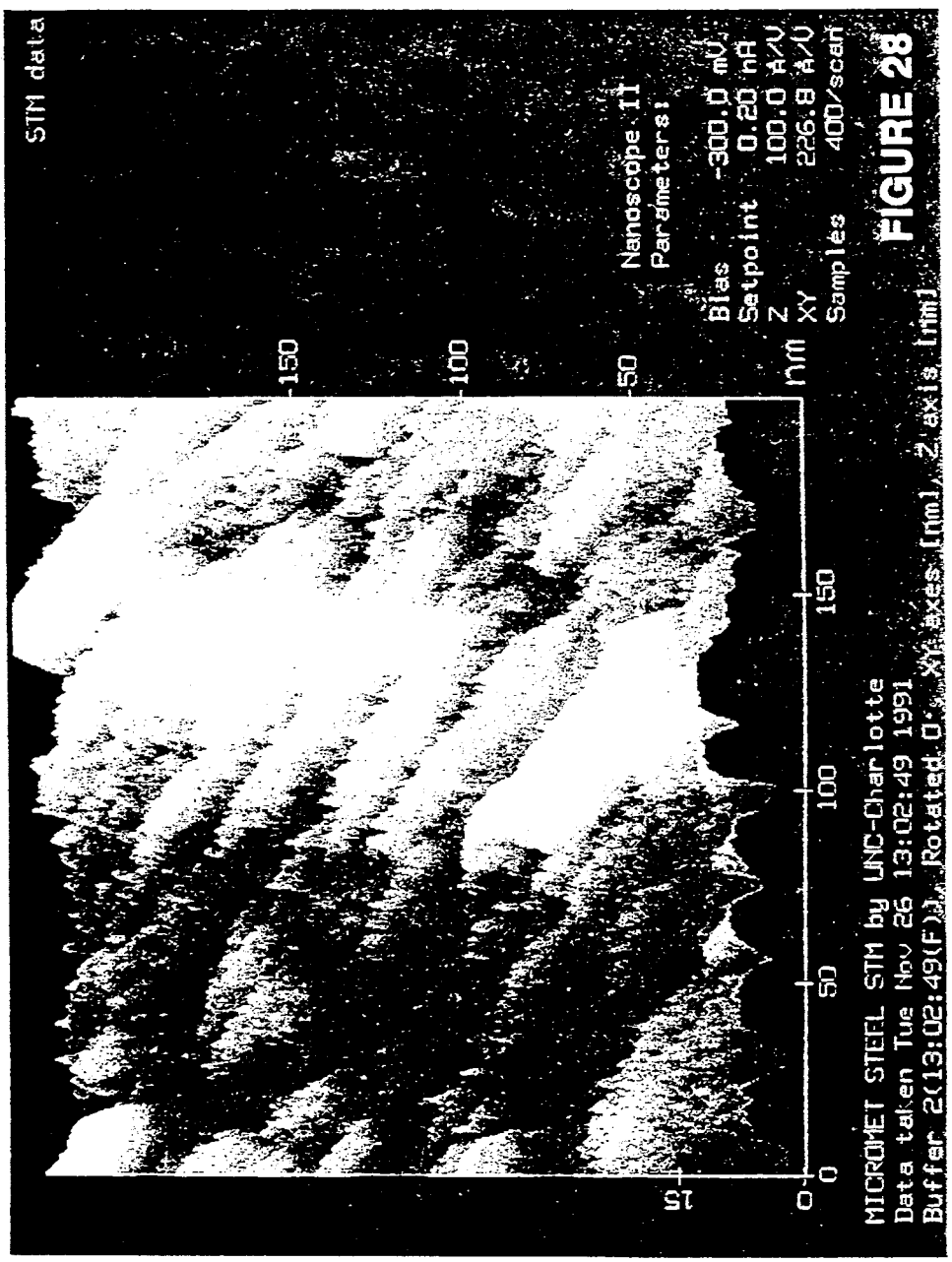

FIG. 28 is yet another STM micrograph, but taken over a scan of 150 nm by 150 nm and at a horizontal measurement of 15 nm.

Figure 29:
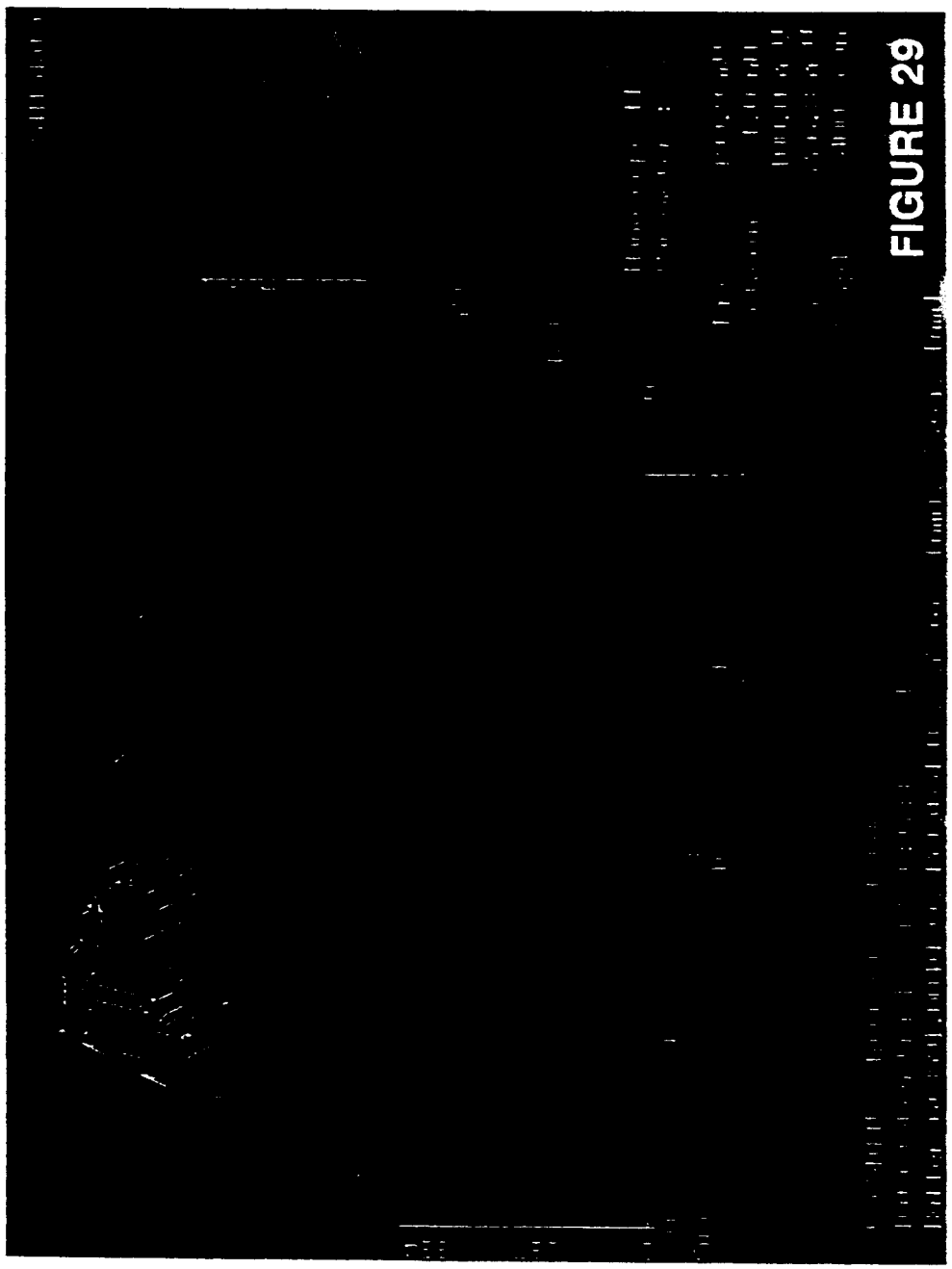
FIGS. 29 through 33 are STM micrographs of a sample according to the present invention plotted as three dimensional topographies.

FIGS. 29 through 34 are further STM data, but in which the results are plotted in a manner that illustrates three dimensional topographical patterns with lines rather than with shaded representations. As can be seen from each of these figures, the area sampled along the X and Y axes is indicated, as is the depth analyzed along Z axis. Thus, FIG. 29 shows an analyzed portion for which the X and Y axes are both 200 nm, but for which the Z axis profile is over 300 nm. At this level of detail, some structure is clearly apparent in which the largest topological features tend to run from the lower left to the upper right of the representation as plotted, with patterns of smaller structural features running from upper left to lower right, consistent with the "spun cable" model herein illustrated in FIG. 34 as well as in the TEMs in FIGS. 35 and 36.

Figure 30:
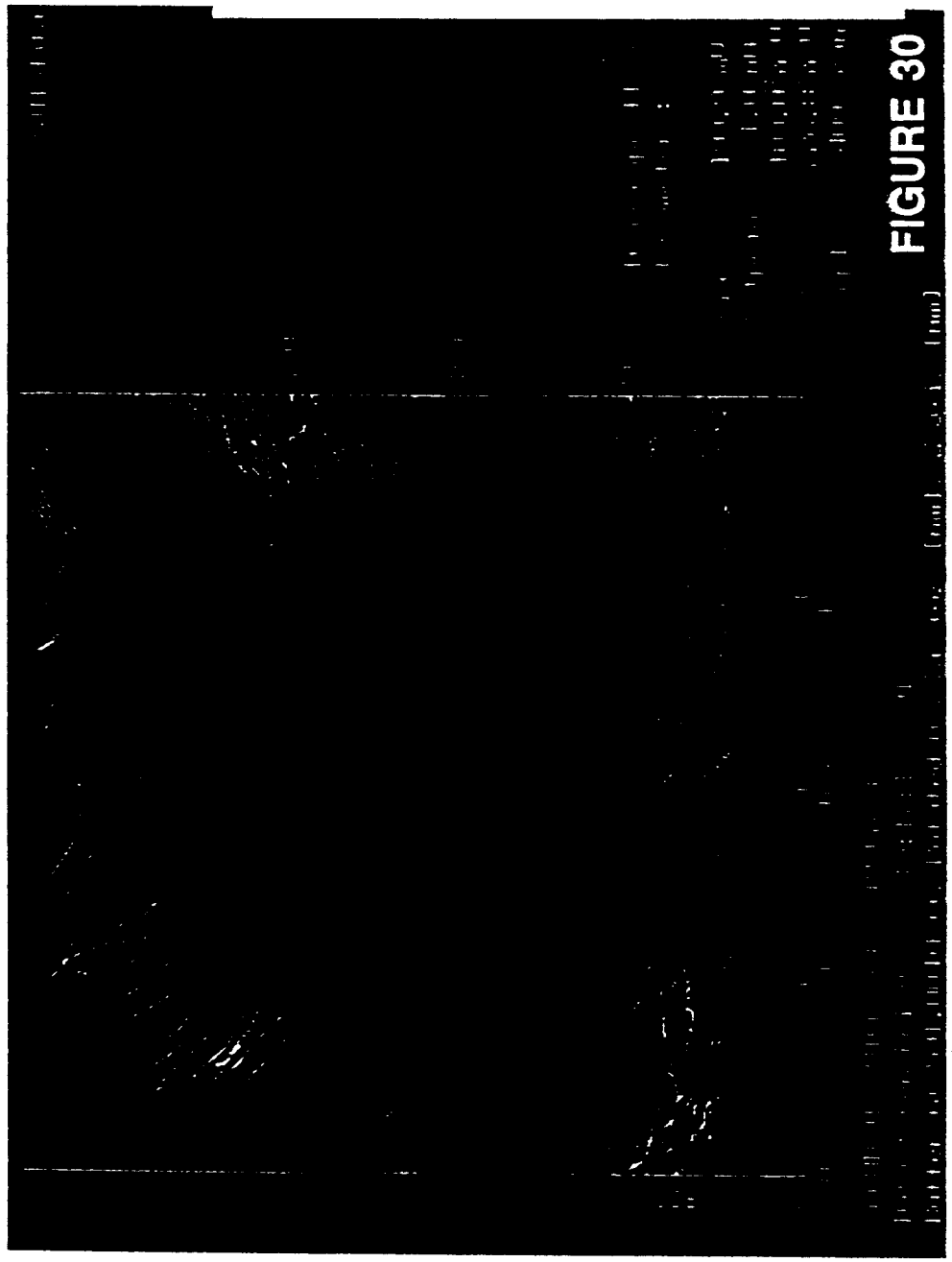

FIG. 30 is a similar micrograph taken at a somewhat greater detail level in that the Z axis dimension analyzed is only 200 nm making some of the structural detail more apparent. As in FIG. 29, a generally larger set of structural features can be seen running from the lower left towards the upper right with a generally smaller set of features running from left to right. It will be understood that such designations as "left to right" and the like are used only for purposes of describing certain of the figures and particular topographical features within those FIGURES, and not as any sort of limitation or absolute orientation.

As stated earlier, the expected size of a $C_6$. fullerene molecule is on the order of about 1 nm. In FIG. 30, there are some very small structural features which have a stairstep appearance in FIG. 30 which are on the order of about 1 nm given the overall 150 nm dimension of the scan in the X and Y directions.

Figure 31:
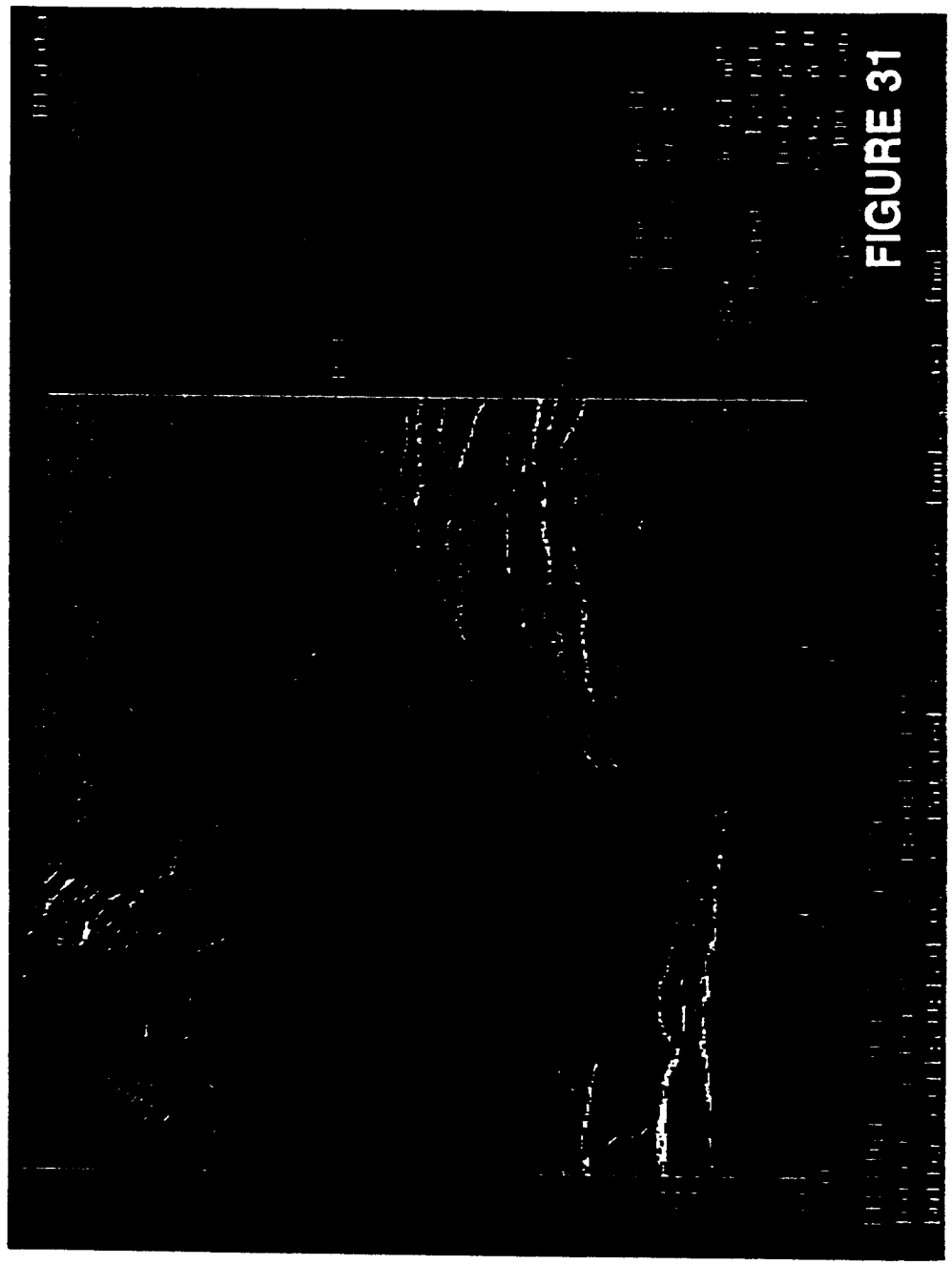

FIG. 31 is yet another slightly more detailed view that is similar to FIGS. 29 and 30 in that the X and Y axes scanned are 150 rtm, but in which the Z axis is only 100 nm, thus giving a slightly greater magnification. Again, some predominant structures can be seen which in the orientation of FIG. 31 appear to run from upper left toward lower right, with the smaller orientations running from lower left to upper right. Additionally the small stairstep features suggesting $C_{60}$ fullerene molecules are likewise visible.

Figure 32:
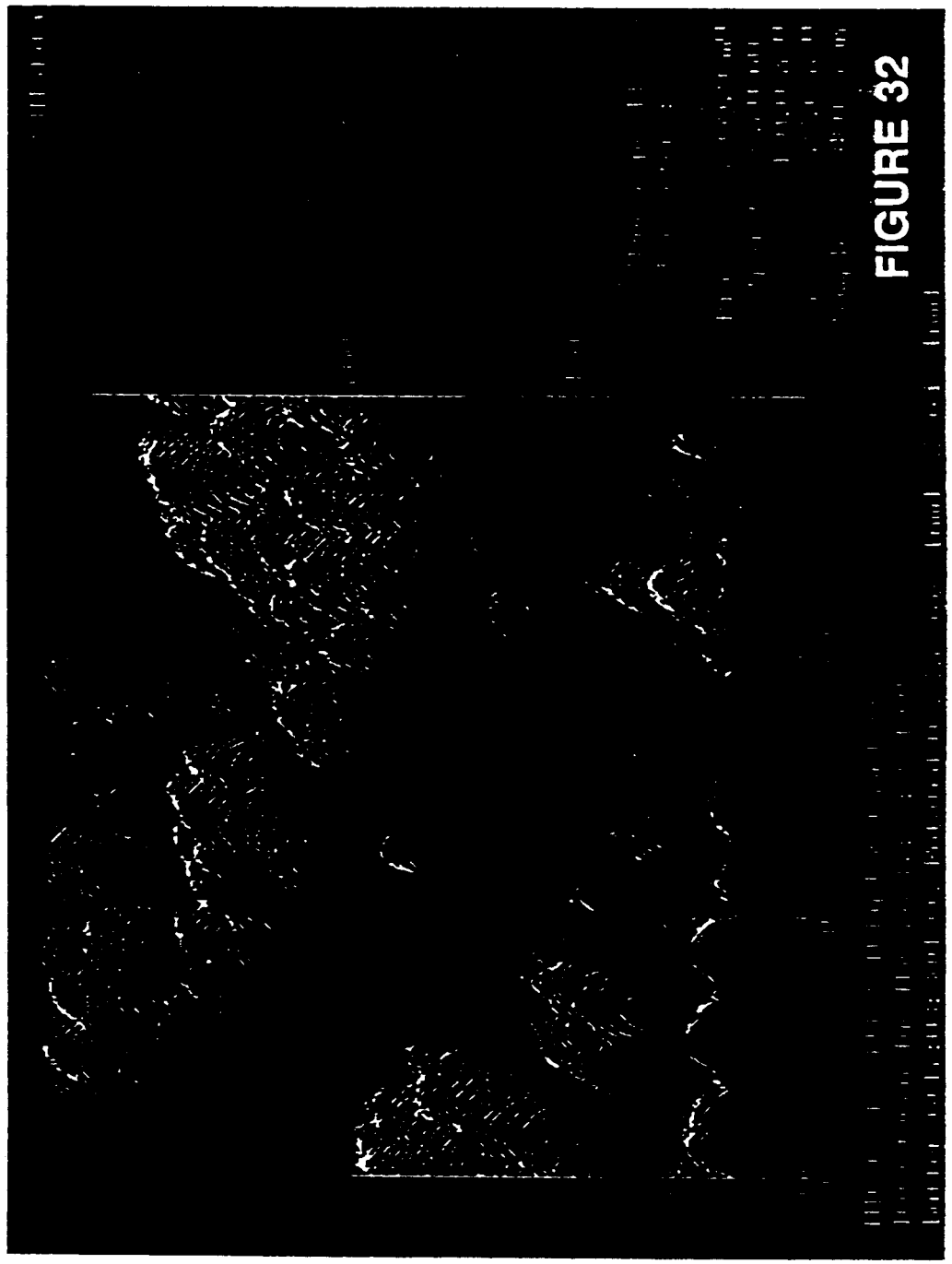

FIG. 32 is slightly greater in magnification than FIG. 31 in that the Z axis scan is taken along 50 nm. In this view, some of the three dimensional features become more prominent, but otherwise appear to be entirely consistent with the other views and evidence herein.

Figure 33:
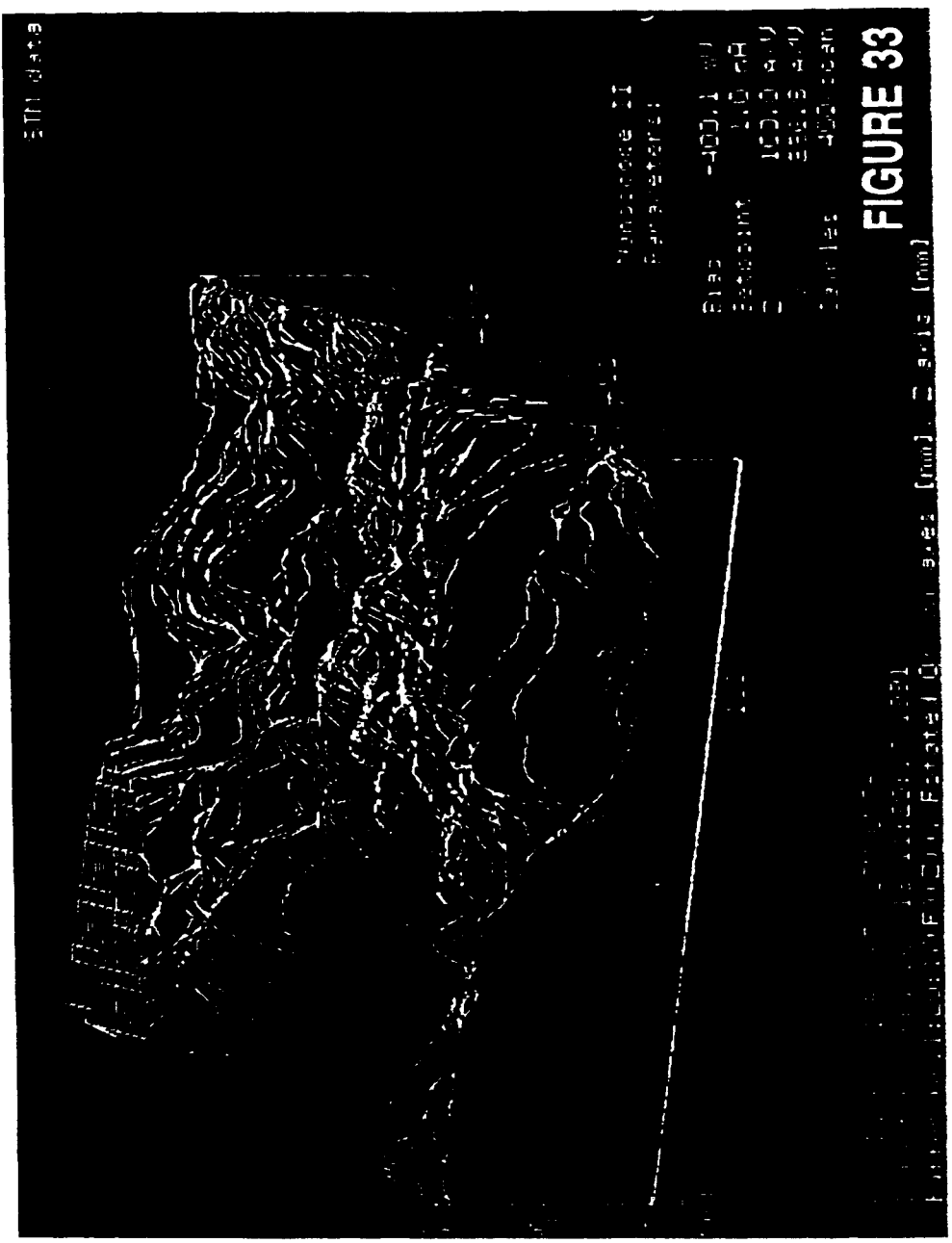

FIG. 33 is the next representation of this type, and is taken along X and Y axes of 150 nm, but also along a Z axis of only 50,nm to obtain progressively more detail. In this case, it will be seen that there are a number of predominant regular features which run in an orientation of upper left toward lower right and in which topographies on the order of 10 rm or so are clearly apparent.

Figure 34:
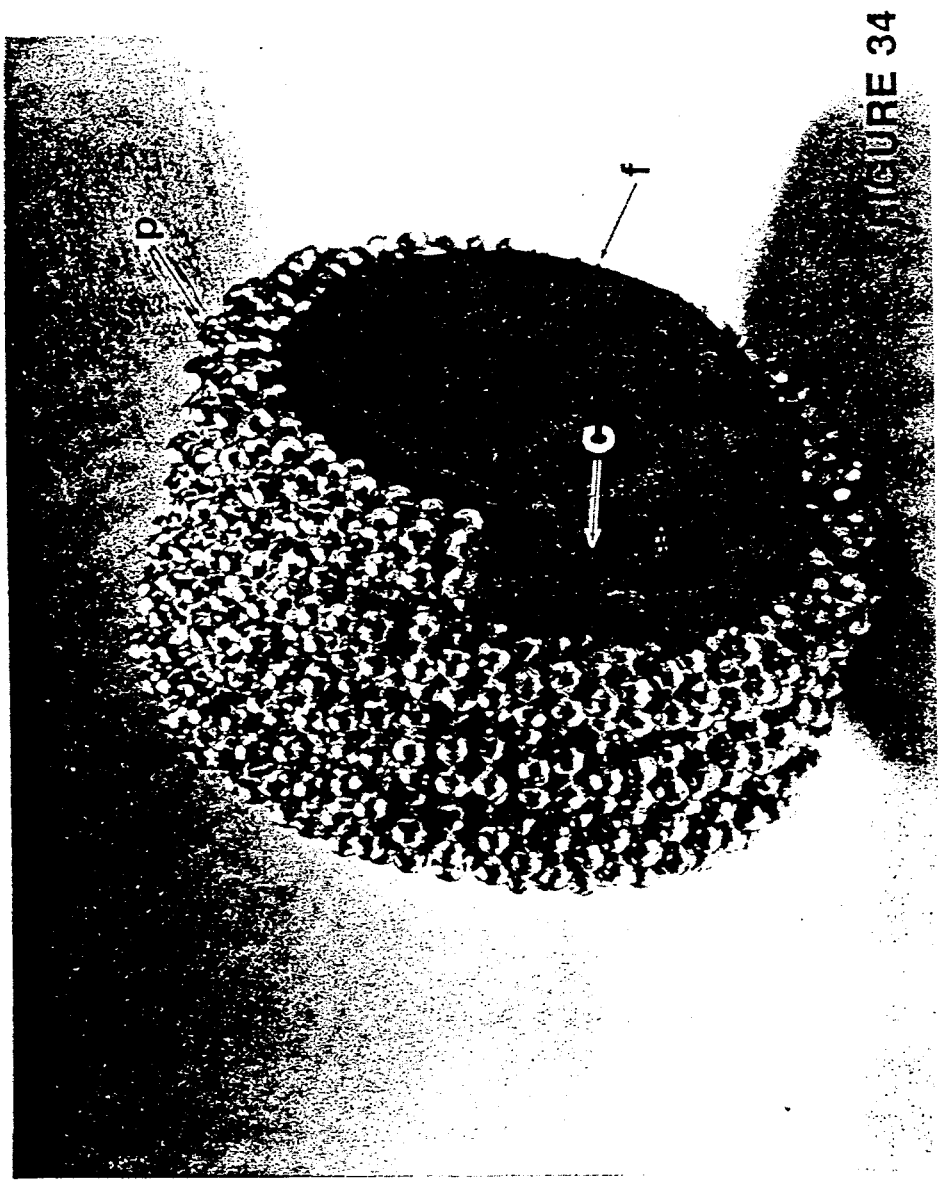
FIG. 34 is a model of one of the types of crystal structure exhibited by the present invention.
Figure 35:
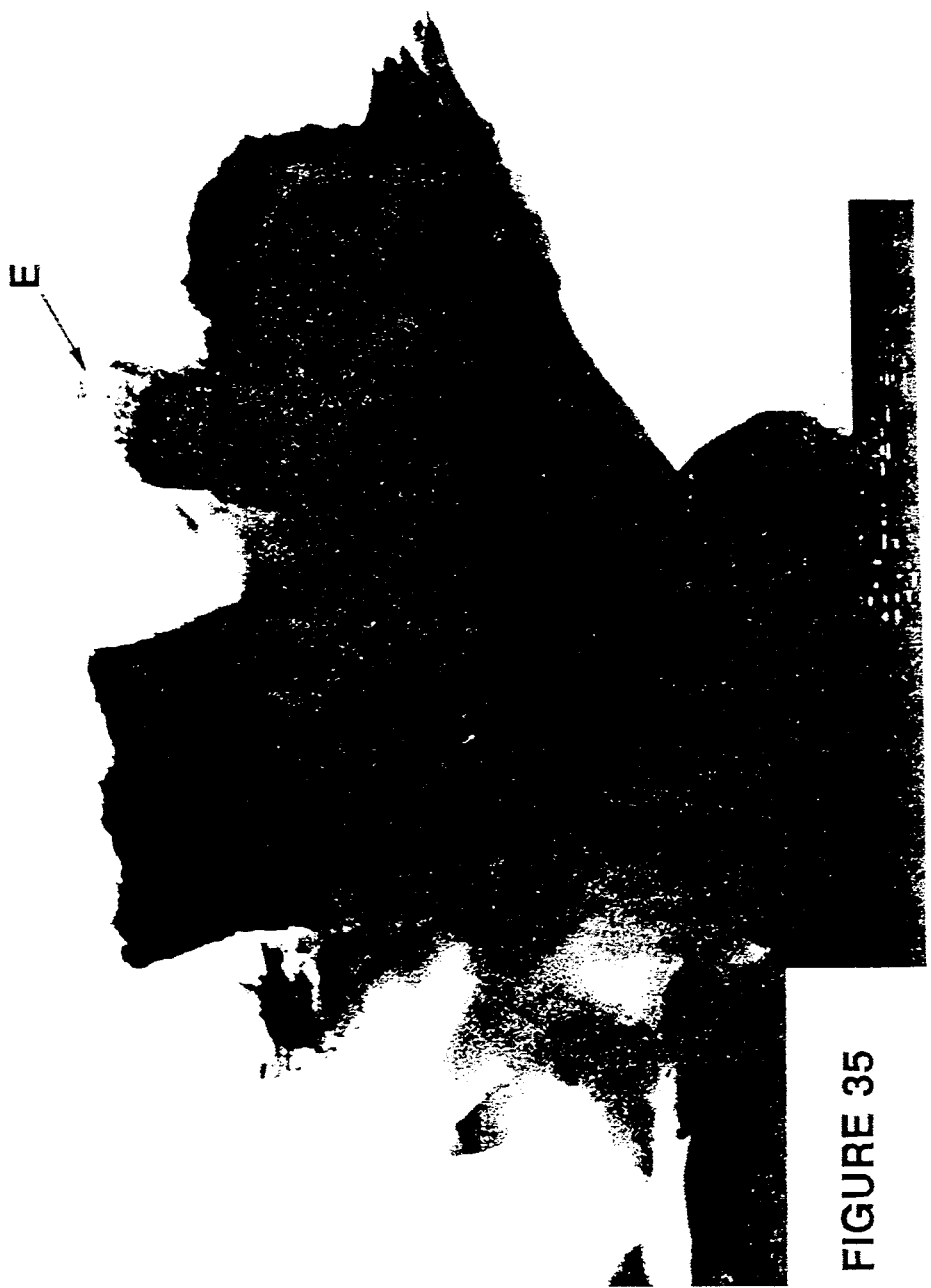
Figure 36:
FIG. 36 is a photographically enlarged view of FIG. 35.

Although the inventor does not wish to be bound by any particular theory, it appears that the data illustrated in FIGS. 29 through 33 are consistent with a spun cabled metallofullerite (FIGS. 34–36). As used herein, that phrase refers to a structure in which a strand of fullerenes is spirally wrapped around a strand of iron atoms to form a larger strand of wrapped iron. This larger strand of wrapped iron is then in turn again wrapped around iron atoms in the lattice to form the overall structure that appears in FIGS. 29 through 33. The structure is named for its resemblance to a double spun steel cable.

FIGS. 34–36 further illustrate the spun-cabled structure that the data appears to indicate. FIG. 34 is a photograph of a model in which generally spherical polygons P (and representing fullerene molecules) are attached in chains wrapped around a core -C of iron atoms. This cable-like structure is in turn wrapped around a larger core of iron F to form the spun-cabled structure.

FIG. 35 is a TEM micrograph of a sample of the invention in which an extending portion E appears to closely resemble the structure modeled in FIG. 34. FIG. 36 is an enlargement of FIG. 35 and again appears to confirm the spun-cabled structure of portions of the material of the present invention. The present evidence appears to indicate that the spun cabled form of crystal structure tends to predominate in the material of the present invention, but it will be understood that this is offered by way of description, and not limitation.

Thus, the invention has all of the characteristics of a steel-like solid ferro-carbon matrix of metallofullerites. In some situations, these form a quasi-crystal structure, and in others a spun cabled orientation, a face centered cubic structure, or a hexagonal closest packing crystal structure.

The steel-like solid of the present invention can comprise between about 0.35 and 2.25% carbon by weight consistent with other types of carbon steel. Many of the tests performed herein were on a sample with about 1.2% carbon by weight which is a useful figure for comparison with other steels. It is expected that the invention can be alloyed in the same manner as conventional steels, while retaining its advantageous characteristics and properties.

As stated earlier, the steel-like solid of the invention forms a homogeneous, nonpearlitic lamella structure.

The ferro-carbon solid has exceptional characteristics of wear, ductility combined with hardenability, and self-healing.

As a result of its characteristics, the steel-like solid of the present invention has a wide variety of applications. It will be understood that those listed herein are exemplary and not limiting of the types of uses that can be made of the product of the invention. Such uses include tool and die applications, molds (e.g. for metals, plastics and composites), shears and forms, measuring and inspecting devices, merchant stock, structural elements, fabrication elements (including stainless, high and low carbon materials, or other alloys), large castings, machine bases, wear surfaces (e.g. abrasive materials handling), and electrical and electronic applications such as conductors, composite materials (e.g. metal-polymer combinations), semiconductors, electrical and electronic devices (e.g. larger resistors), magnets and magnetic applications. From a chemical standpoint, the invention is expected to have application in a number of areas as already foreshadowed by current interest in fullerene chemistry, including promising areas such as catalytic or pharmaceutical applications.

The invention further comprises a method of forming the steel-like solid described herein. In its broadest sense, the method comprises interrupting a melt through a cooling curve to preserve the melt at the point at which the solidifying metal passes through the allotropic transformation stage. More specifically, the method can be thought of as mixing a high carbon metallic constituent, for which iron is presently preferred, and a low carbon metallic constituent in an amount sufficient to form a mixture with a desired carbon content of a preferred final composition. The mixture is then heated to a temperature at which the high carbon constituent becomes liquidus and below the temperature at which the lower carbon constituent becomes liquidus. The mixture is then slightly cooled to a temperature at which the allotropic phase transformation begins for the final composition. Finally, fullerenes and fullerene chains are formed in the mixture by maintaining the temperature, and adding heat as necessary, for a time sufficient for the carbon present to form fullerenes and fullerene chains.

In other embodiments, the step of mixing a high carbon allotropic metallic constituent and a low carbon allotropic metallic constituent can comprise mixing constituents in which the allotropic metal is selected from the group consisting of: aluminum, chromium, cobalt, iron, molybdenum, nickel, platinum, titanium, tungsten, and vanadium.

In other preferred embodiments, the step of heating the mixture comprises heating the mixture to a temperature at which the higher carbon constituent is liquidus, but at which the lower carbon constituent is solid and at which temperature a solid defined by the mixture would remain solid until the mixture equilibrates at that temperature; and heating the mixture to a higher temperature at which the mixture is partially liquidus and partially allotropic solid.

Additionally the step of forming fullerenes and fullerene chains can comprise adding heat as necessary to maintain the temperature within the temperature range of allotropic transformation for the mixture with the desired carbon content.

In a presently most preferred embodiment, the method comprises mixing constituents in which the allotropic metal is iron; the step of heating the mixture comprises heating the mixture to a first temperature above the temperature in the iron-carbon equilibrium at which the higher carbon constituent would be liquidus, while below the temperature at which either the lower carbon constituent or the mixture would be liquidus; and the step of forming fullerenes and fullerene chains comprises heating and then maintaining the mixture at a temperature in the iron carbon equilibrium at which iron having a composition defined by the mixture is present as a mixture of one of its allotropic forms and a liquidus.

In preferred embodiments, the step of heating the mixture comprises heating the mixture to approximately 2450° F., and the step of maintaining the mixture comprises maintaining the mixture at approximately 2450° F.

Alternatively, the method can comprise melting a high carbon component to total liquidus; introducing a low carbon component as a solid into the high carbon component liquidus in an amount sufficient to form a mixture with a desired carbon concentration while maintaining the temperature lower than the temperature at which the low carbon component would become liquidus; and forming fullerenes and fullerene chains in the mixture by maintaining the temperature at a temperature at which the allotropic phase transformation begins for the mixture for a time sufficient for the carbon present to form fullerenes and fullerene chains.

Figure 41:
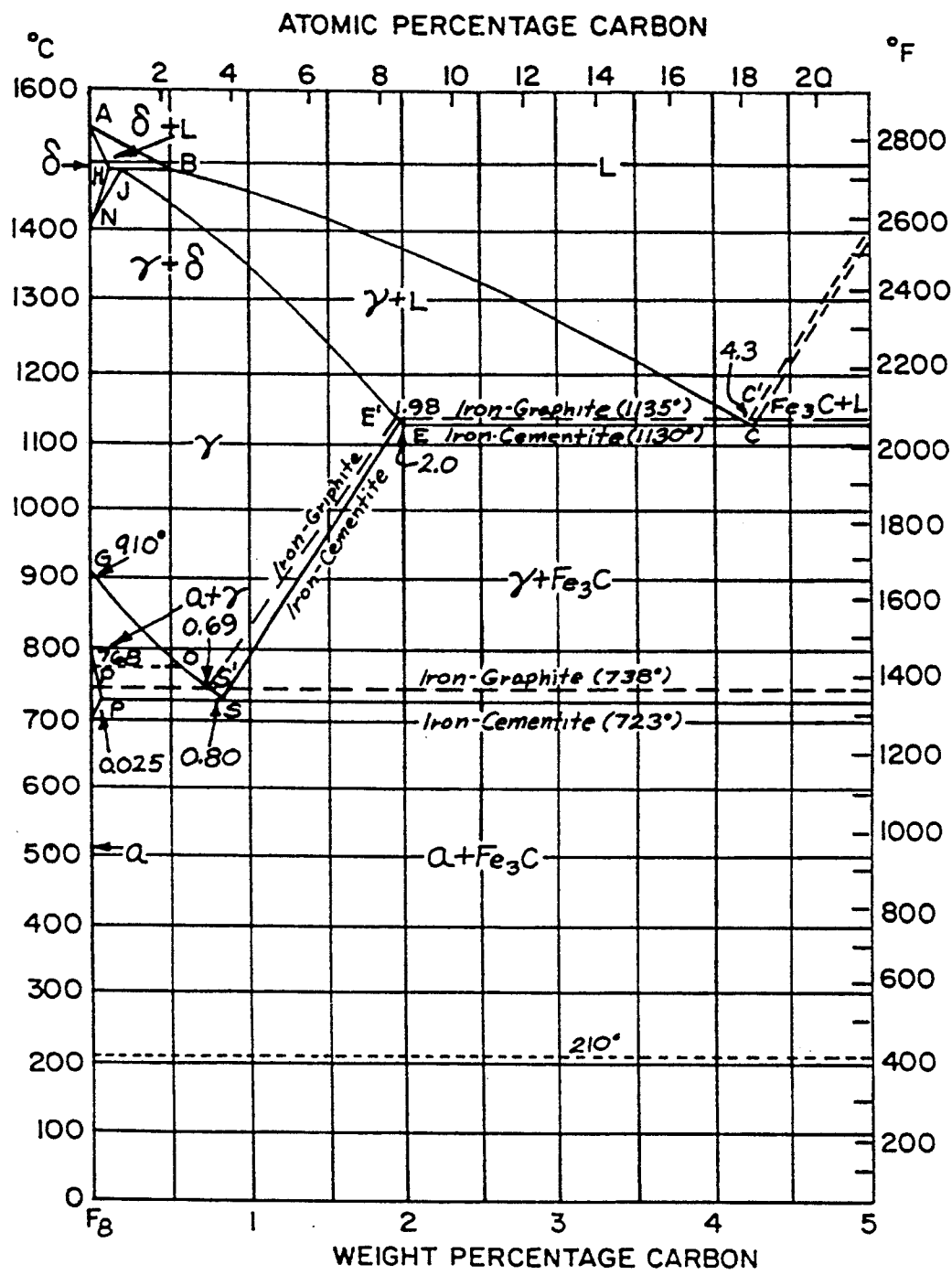
FIG. 41 is the iron-carbon equilibrium diagram.

In this regard, FIG. 41 is a reproduction of the iron-carbon equilibrium system and is included herein for purposes of illustration and not limitation. Those familiar with the metallurgical arts will recognize that the method aspects of the invention can be similarly applied to other metals on the basis of their equilibrium systems, including alternative alloys of iron such as those incorporating chromium or other elements for their intended alloying characteristics. It will be seen that in accordance with Example 1 herein, at the preferred heating temperature of 2450° F., the 4.3% carbon component (i.e. the "high" carbon component) would be entirely within the liquidus portion of the equilibrium diagram, while the 0.01% carbon component (the "low" carbon component) would be entirely solidus. As the components are mixed and allowed to equilibrate, however, it will be seen that a ferro-carbon with the final content of 1.2% carbon, when maintained at 2450° F., will be partially solid and partially liquidus in accordance with the described method. Thus, the use of a metal-carbon equilibrium scheme, as expressed in a typical diagram, represents an alternative manner of expressing the method of the invention.

Additionally, it can be seen from the equilibrium diagram that the expressions "would be liquidus" or "would be solidus" or the like refer to temperatures and conditions that can be determined from an equilibrium diagram by those of ordinary skill in these arts and without undue experimentation.

EXAMPLE 1

A first sample of the invention was prepared for a final analysis of 1.2% carbon, manganese below 14, silicon below 1%, and all other elements in trace amounts. A final melt size of 5 lbs. was desired. Accordingly, 1.4 lbs. of 4.3% high carbon material (i.e. cast iron) was mixed with 3.6 lbs. of 0.014 carbon material. A small amount of 0.25% borax was added as a degassifier. A gas muffle furnace was heated to 2250° F. and the material was placed in the furnace and covered. When the material reached a temperature of 2250° F., the heat was increased to 2450° F. and was held for 20 minutes. The heat was then reduced to 2250° F. for 10 minutes. When the molten material lost its ephoresence, the furnace was returned to 2450° F. and temporarily held at that temperature for 15 minutes. The furnace was then shut down and the material removed to cool to room temperature in the crucible. The resultant material is reported herein as the sample designated "3591", and had a chemical composition of 1.21% carbon, 0.154 chromium, 0.12% manganese, 0.89% silicon, with the remainder iron. This composition was performed and determined by Advanced Testing Laboratory of Norwood, Ohio. The microstructure was determined by removing a longitudinal and transverse section from a tested tensile specitaen and metallographically prepared and etched with a 2% nital reagent.

Results of this examination described the sample as having a microstructure consisting primarily of interdendritic carbides with a martensitic matrix. The microstructure was determined by removing a longitudinal and transverse section from a tested tensile specimen and metallographically prepared and etched with a 2% nital reagent. This same examination showed the sample to have a chemical composition (by weight) of 1.21% carbon, 0.15% chromium, 0.12% manganese, 0.89% silicon, with the remainder iron.

EXAMPLE 2

A second sample was prepared for a final analysis of about 1.1% carbon, manganese below 1%, silicon below 1%, and all other metals in trace amounts. A final melt size of 5 lbs. was again targeted. Accordingly, 1.18 lbs. of 4.3% carbon material was mixed with 3.82 lbs. of 0.01% carbon material. The 0.25% borax degassifier was added, and the gas muffle furnace heated to 2250° F. The material was placed in the furnace and covered until the material temperature reached 2250° F. The heat was then increased to 2550° F. and held for 20 minutes. The heat was then reduced to 2250° for 10 minutes. Upon the molten material losing its ephoresence, it was again heated to 2550° F. and temporarily held at that temperature for 15 minutes. The furnace was then shut down and the material removed to cool at room temperature in the crucible.

EXAMPLE 3

A third sample was prepared for a final analysis of 1.6% carbon, less than 1% manganese, less than 1% silicon, and all other elements in trace amounts. For this sample, 1.89 lbs. of 4.3% carbon material was mixed with 3.11 lbs. of 0.01% material. This mixture was mixed with 0.25% borax and the gas muffle furnace again heated to 2250° F. A second furnace was heated to 2450° F. and a mold brought up to furnace temperature. The material was placed in a covered crucible in the first furnace and brought to 2250°F. Once the material reached 2250° F., the heat was increased to 2375° F. and temporarily held at that temperature for 20 minutes. The second furnace was then turned off and the material removed from the first furnace and poured from the crucible into the heated mold. The material in the heated mold was then removed and cooled to room temperature. This zaaterial is reported as the "3691" sample of the solid material of the invention.

EXAMPLE 4

A product with a final analysis of 0.85% carbon is projected with manganese present below 1% and silicon likewise present below 14, with all other elements in trace amounts depending totally on purity of the base product, control of the furnace atmosphere, and similar parameters. Based on a projected final melt size of 5 lbs., 1.2 lbs. of 3.77% carbon product is mixed with 3.8 lbs. of 0.20% carbon product. This is mixed with an appropriate degassification product, such as borax, and introduced into the furnace. The furnace, for which the type is of no particular significance, is heated to 2350° F. and the material is normalized at that temperature. At this point the furnace is increased in temperature to 2600° F. and held for 20 minutes. The furnace is then reduced in temperature to 2400° F. for the period required for the material to lose its incondenscence. At this point the furnace is returned to 2600° F. and temporarily held at that temperature for 15 minutes. The material is removed from the furnace to cool to room temperature or to a tundre for use in a continuous casting operating or the like. The resultant material will be consistent in structure with sample 3691, and will have an overall carbon content of 0.85%.

EXAMPLE 5

A final analysis of 2.25% carbon is projected, again with manganese less than 1%, silicon less than 1%, and all other metals or elements in trace amounts. A 100 lb. melt is developed from 54 lbs. of 4% cast iron product produced from scrap iron. This material is refined utilizing standard degassifying technology and systems. The carbon content is adjusted using standard technology and systems. The material is melted in any standard industrial furnace and normalized in a tundre at 2600°F. Forty-six lbs. of 1020 low carbon product is introduced in pellet form to the melt. The mixture of melt and added pellets is then reheated to and temporarily held at 2250° F. for 15 min. and removed to a preheated cast ingot vessel or to a continuous casting line.

EXAMPLE 6

A final analysis of 0.35% carbon is projected again with manganese less than 1%, silicon less than it and other elements present in trace amounts based on the remaining parameters. Based on a final melt size of 10 lbs., 0.81 lbs. of 4.3 cast iron are mixed with 9.2 lbs. of 0.01% carbon iron and mixed with an appropriate degassification product and introduced into a furnace in an appropriate vessel. The furnace is heated to 2450° F. and normalized at that temperature. The furnace is then increased in temperature to 2750° F. for 20 minutes. The furnace is then reduced in temperature for the time required to lose its incondenscence, at which point the furnace is returned to 2750° F. and temporarily held at that temperature for 15 minutes. The material is removed from the furnace to cool to room temperature or to a tundre for use in a continuous casting operation. The resulting material will be consistent in structure with sample 3691 described earlier, and with an overall carbon content of 0.35%.

The sample designated 3591 was also heated to 1700° F. and quenched in water. The as-quenched hardness was found to be between 63 and 64 on the Rockwell C scale. Additionally, sample 3591 was chemically analyzed and found to have the following composition by weight percent:

| Carbon | 1.21 |
|---|---|
| Manganese | 0.12 |
| Silicon | 0.89 |
| Iron | Remainder |

Compression testing of samples of the present invention were carried out by Metcut Research Associates Inc. in Cincinnati, Ohio. At room temperature, the strain rate through failure was 0.005 in./in./min. as follows:

| Sample | Rc | Specimen Dimension (Inches) | U.C.S.[b] (ksi) | 0.2% Y.S.[c] (ksi) |
|---|---|---|---|---|
| 3591[a] | 62 | 0.25 dia. × 0.75 | 338.9 | 232.5 |
| 3591 | 27 | 0.50 dia. × 1.5 | 109.6 | 63.3 |

Figure 37:
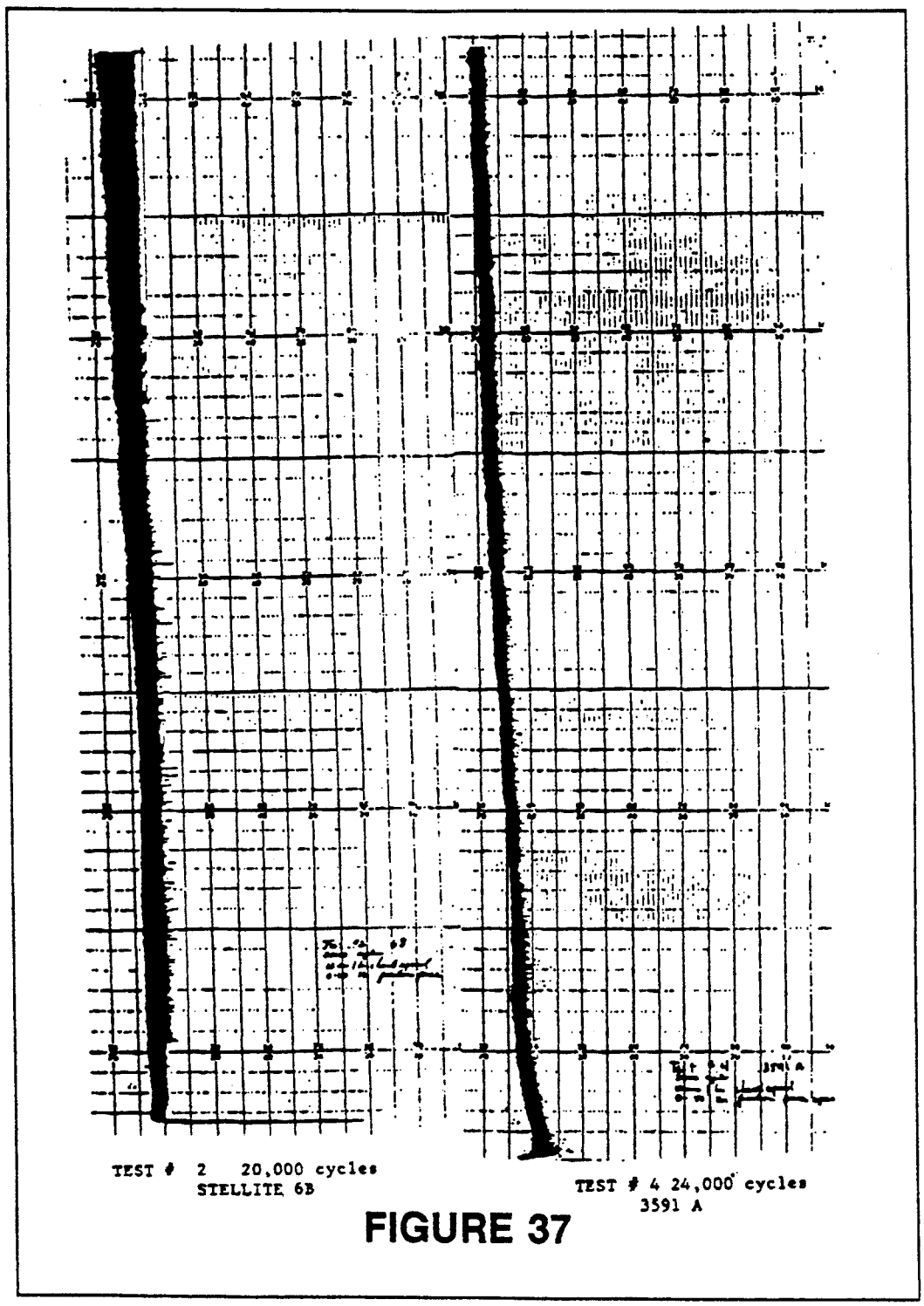
FIGS. 37 through 39 represent mechanical testing data.
Figure 38:
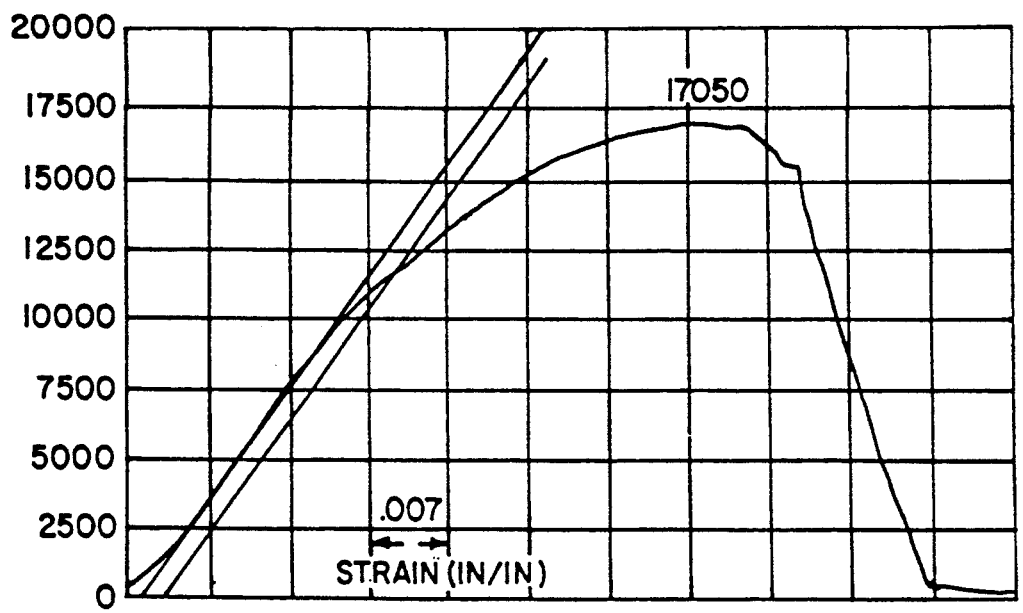
Figure 39:
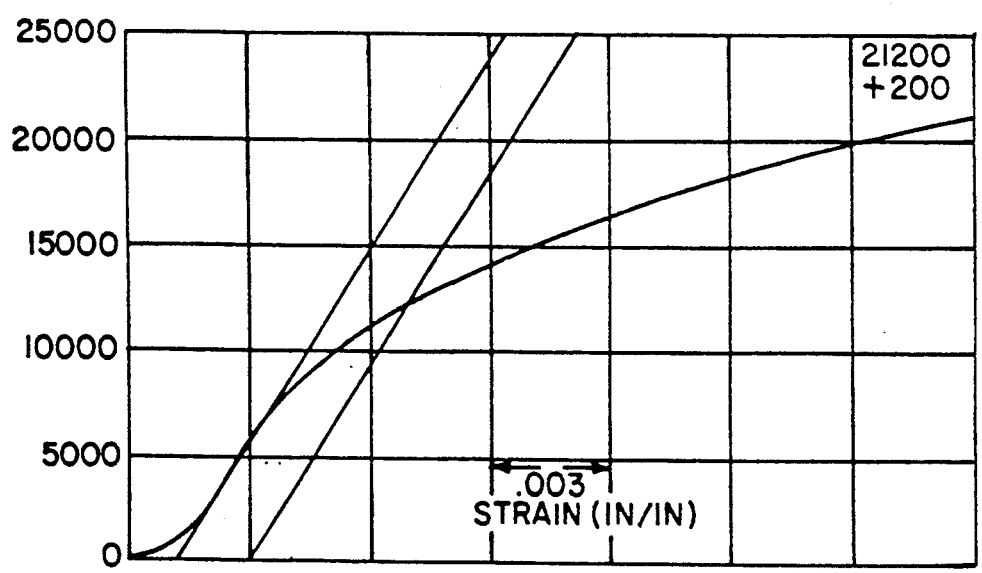

[a]Flash quenched in room temperature oil
[b]Ultimate Compressive Strength
[c]Yield Strength FIGS. 37–39 represent mechanical testing carried out independently on sample 3591 of the exemplary product of the present invention by the indicated facilities. Sample 3591 was a continuous-cast single pass formed structural product.

FIG. 37 represents an ASTM G77/D2714 modified comparative analysis on sample 3591 of the exemplary product of the present invention and Stellite 6B. Both materials were hardened to 62 Rc. As clearly illustrated, sample 3591 demonstrably outperformed Stellite 6B and was exhibiting a "self-healing" of its surface after more than 20,000 cycles: a property consistent with the structure. In contrast, normal steels are only tested up to 5000 cycles, after which they tend to fail. Thus, the performance of the material of the invention as measured by this test is most unusual and highly favorable.

FIGS. 38 and 39 illustrate the very high ultimate compressive strength (U.C.S.) and yield strength (Y.S.) of the material (i.e. as also summarized in the table above) as well as its ductility in the Rc 27 matrix.

As a product, this new and novel family of products having metallofullerite structures provides a number of advantages. These include: economy of production through highly reduced energy requirements for the overall melt process; highly reduced energy requirements for the forming stage of production; highly reduced energy requirements for the matrix modification stages of production (heat-treating); the ability to be cast to near-finished form; extremely low energy requirements for the hot and cold forming stages of production; and very low levels of material loss through scale or other oxide production during hot working.

The invention further provides exceptional metallurgical properties consistent with the embodiment of fullerene structures with metallic substances. These include: high comcressive strengths without alloying; high tensile strengths without alloying; high ductility without alloying; an ability to "self-heal" its surface without material loss or alloying; extremely high wear resistance without alloying; unique levels of resistance to oxidation without alloying; unique electrical properties without alloying; and the ability to respond to alloying to further the above.

The invention also resolves the problem of encapsulating and combining fullerene structures with metallic substances.

Additionally, the invention provides a modification of the traditional time-temperature-transformation (TTT) curve not suggested in the prior art.

Finally, the invention provides an operative result for the previously unsolved need to incorporate fullerene forms of carbon with metallofullerite structures in an economic and commercially viable manner.

Figure 40:
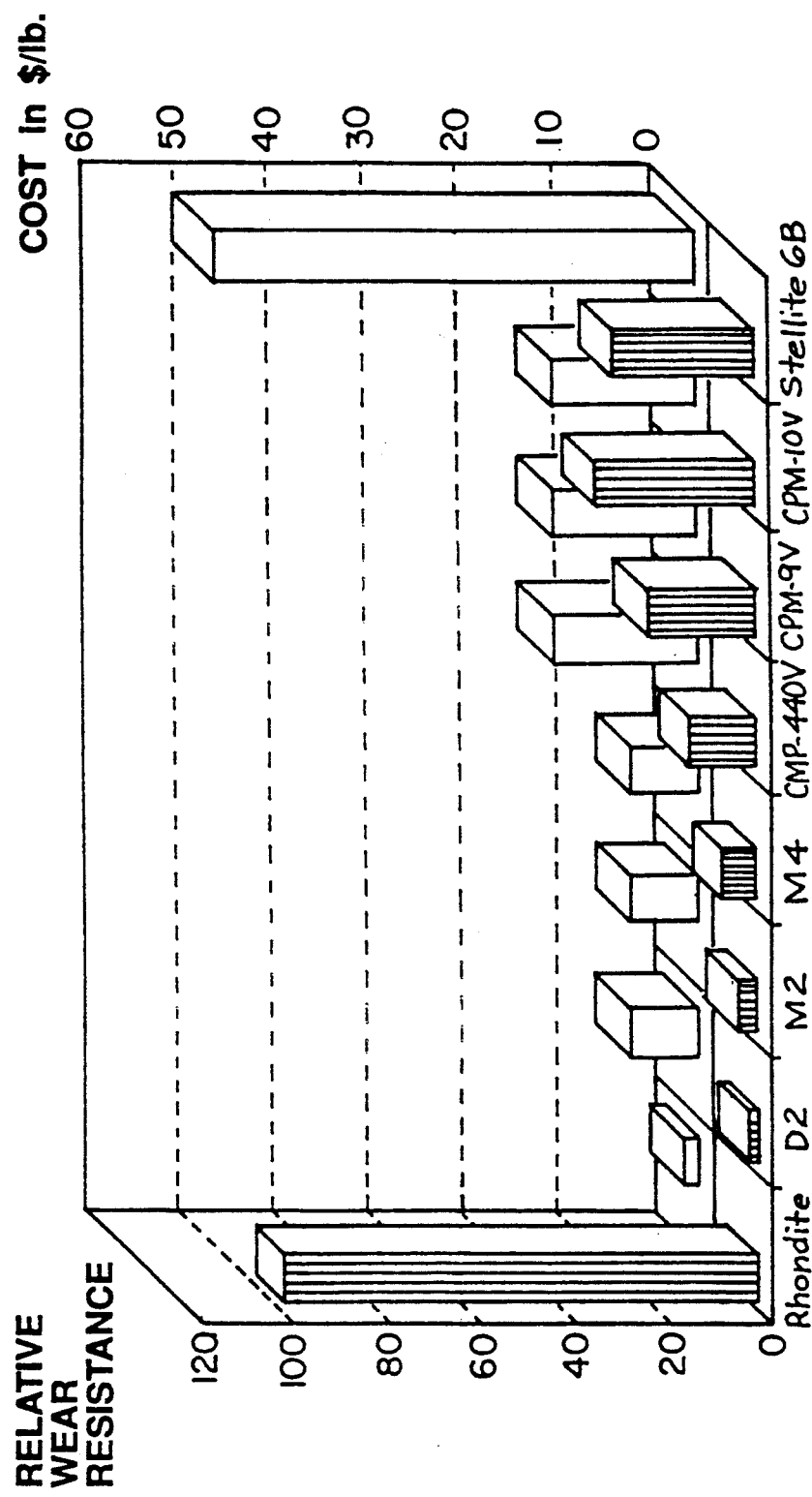
FIG. 40 is a chart exhibiting the cost and performance advantages of the present invention.

In this regard, FIG. 40 is a plot representing wear resistance versus cost for the material of the present invention ("Rhondite") compared with other appropriate alloys on the basis of ASTM G-77 testing. FIG. 40 demonstrates that the invention is by far the most cost effective of the materials listed.

In the drawings and specification, there have been disclosed typical preferred embodiments of the invention and although specific terms have been employed, they have been used in a generic and descriptive sense only and not for purposes of limitation, the scope of the invention being set forth in the following claims.

That which is claimed is:

1. A metallic solid comprising a ferro-carbon matrix of iron and iron fullerites.

2. A metallic solid according to claim 1 wherein said iron fullerites have a quasicrystal structure.

3. A metallic solid according to claim 1 comprising from about 0.35 percent carbon by weight.

4. A metallic solid according to claim 1 comprising about 1.2 percent carbon by weight.

5. A metallic solid according to claim 1 wherein said ferro-carbon matrix of iron and iron fullerities is a lamella structure and is nonpearlitic.

6. A metallic solid according to claim 1 comprising a hexagonal close packed crystal structure.

7. A metallic solid according to claim 1 comprising a face centered cubic packing crystal structure.

8. A metallic solid according to claim 1 comprising a spun cabled structure.

9. A metallic solid according to claim 1 comprising a continuously-cast, single pass, formed structural product.

10. A metallic solid characterized by exceptional metallic properties even in the absence of alloying, said solid comprising:

a ferro-carbon matrix of iron and iron fullerites in which carbon is present in an amount of from about 0.35 to about 2.25 percent by weight; and wherein the iron fullerites have structures selected from the group consisting of: individual iron atoms encapsulated in fullerene molecules; chains of fullerene molecules wrapped around a plurality of iron atoms; fullerence molecules in crystal lattices with iron atoms; and combinations of the same.

11. A method of forming a ferro-carbon steel having exceptional characteristics of wear, ductility combined with hardenability, and self-healing, the method comprising forming a metallic solid comprising a ferro-carbon matrix of metallofullerities by interupting and temporarily holding an iron-carbon melt at a point through the cooling curve at which the solidifying metal passes through the allotropic transformation stage for the metal defined by the overall proportion of iron and carbon in the melt.

12. A method of forming iron fullerites to produce a metallic solid having exceptional characteristics of wear, ductility combined with hardenability, and self-healing, the method comprising:

heating a mixture of a higher carbon iron constituent and an amount of a lower carbon iron constituent wherein the amounts are sufficient for the mixture to have a desired carbon content to a temperature at which the higher carbon iron constituent would be liquidus and below the temperature at which the lower carbon iron constituent would be liquidus; and forming fullerenes in the mixture for further heating the mixture to, and temporarily holding the temperature within the temperature range of liquidus-solidus transformation for the mixture with the desired carbon content for a time sufficient for the carbon present to form fullerenes.

13. A method of forming iron fullerities to produce a metallic solid having exceptional characteristics of wear, ductility combined with hardenability, and self-healing, the method comprising:
mixing a high carbon iron constituent and a lower carbon iron constituent in amounts sufficient to form a mixture with a desired carbon content;
heating the mixture to a temperature at which the higher carbon iron constituent would be liquidus and below the temperature at which the lower carbon iron constituent would be liquidus; and
forming fullerenes in the mixture by further heating the mixture to, and temporarily holding the temperature within, the temperature range of liquidus-solidus transformation for the mixture with the desired carbon content for a time sufficient for the carbon present to form fullerenes; and
cooling the mixture to a metallic solid form.

14. A method according to claim 13 wherein the step of heating the mixture comprises:
heating the mixture to a temperature at which the higher carbon constituent would be liquidus, but at which the lower carbon constituent would be solid and at which temperature a solid defined by the mixture would remain solid until the mixture equilibrates at that temperature; and
heating the mixture to a higher temperature at which the mixture is partially liquidus and partially allotropic solid.

15. A method according to claim 13 wherein the step of forming fullerenes comprises adding heat as necessary to temporarily hold the temperature within the temperature range of allotropic transformation for the mixture with the desired carbon content.

16. A method according to claim 13 wherein:
the step of mixing a high carbon allotropic metallic constituent and a low carbon allotropic metallic constituent comprises mixing constituents in which the allotropic metal is iron;
the step of heating the mixture comprises heating the mixture to a first temperature above the temperature in the iron-carbon equilibrium at which the higher carbon constituent becomes totally liquidus, while below the temperature at which either the lower carbon constituent or the mixture become liquidus; and
the step of forming fullerenes comprises heating and then temporarily holding the mixture at a temperature in the iron carbon equilibrium at which iron having a composition defined by the mixture is present as a mixture of one of its allotropic forms and a liquidus.

17. A method according to claim 16 wherein the step of heating the mixture comprises heating the mixture to approximately 2450° F.

18. A method according to claim 16 wherein the step of temporarily holding the mixture comprises temporarily holding the mixture at approximately 2450° F.

19. A method of forming a ferro-carbon steel having ex ional characteristics of wear, ductility combined with hardenability, and self-healing, the method comprising:
forming fullerenes in a mixture of a low carbon component introduced as a solid into a liquidus melt of a high carbon component in which the components are present in respective amounts sufficient to form a mixture with a desired carbon concentration by temporarily holding the mixture at a temperature at which the allotropic phase transformation begins for the mixture for a time sufficient for the carbon present to form fullerenes.

20. A method of forming a ferro-carbon steel having exceptional characteristics of wear, ductility combined with hardenability, and self-healing, the method comprising:
melting a high carbon component to total liquidus;
introducing a low carbon component as a solid into the high carbon component liquidus in an amount sufficient to form a mixture with a desired carbon concentration while temporarily holding the temperature lower than the temperature at which the low carbon component becomes liquidus;
forming fullerenes in the mixture by temporarily holding the temperature at a temperature at which the allotropic phase transformation begins for the mixture for a time sufficient for the carbon present to form fullerenes.

* * * * *